US012789362B2

(12) United States Patent
Hunt

(10) Patent No.: US 12,789,362 B2
(45) Date of Patent: Nov. 10, 2026

(54) EXTENSION AND RETRACTION ACTUATORS WITH PARALLEL ARRANGEMENT

(71) Applicant: Sol Robotics, Inc., Albuquerque, NM (US)

(72) Inventor: Justin Hunt, Redwood City, CA (US)

(73) Assignee: Sol Robotics, Inc., Albuquerque, NM (US)

( * ) Notice: Subject to any disclaimer, the term of this patent is extended or adjusted under 35 U.S.C. 154(b) by 0 days.

(21) Appl. No.: 18/661,450

(22) Filed: May 10, 2024

(65) Prior Publication Data

US 2024/0375271 A1 Nov. 14, 2024

Related U.S. Application Data

(60) Provisional application No. 63/587,436, filed on Oct. 2, 2023, provisional application No. 63/466,091, filed on May 12, 2023.

(51) Int. Cl.
*B25J 9/10* (2006.01)
*B25J 5/00* (2006.01)
(Continued)

(52) U.S. Cl.
CPC ............. *B25J 9/1045* (2013.01); *B25J 5/007* (2013.01); *B25J 17/0241* (2013.01);
(Continued)

(58) Field of Classification Search
CPC ...... B25J 5/007; B25J 9/1045; B25J 17/0241; B25J 17/0258; B25J 18/025; B25J 18/04; B25J 9/104
See application file for complete search history.

(56) References Cited

U.S. PATENT DOCUMENTS 2,130,993 A * 9/1938 Dubiller ................ F16H 19/064 343/900
3,213,573 A * 10/1965 Bohr .................... H01Q 1/1235 174/DIG. 11
(Continued)

OTHER PUBLICATIONS

International Search Report and Written Opinion mailed Sep. 20, 2024, for PCT Application No. PCT/US2024/028977 filed May 10, 2024, twelve pages.
(Continued)

*Primary Examiner* — William C Joyce
(74) *Attorney, Agent, or Firm* — Morrison & Foerster LLP

(57) ABSTRACT

An example system comprises an end effector, a base, a first actuator, a second actuator, and a control circuit. The first actuator comprises a proximal end coupled to the base at a first joint, a distal end coupled to the end effector, a rotatable member, and a coiling support member coupled to the distal end. At least a portion of the first length is configured to coil around the rotatable member and further configured to uncoil from the rotatable member. The second actuator comprises a proximal end coupled to the base at a second joint, the second joint separated from the first joint by a distance, and a distal end coupled to the end effector. The control circuit is configured to extend and retract the first actuator along an axis of the first actuator and configured to extend and retract the second actuator along an axis of the second actuator.

62 Claims, 13 Drawing Sheets

(51) Int. Cl.

| | |
|---|---|
| ***B25J 17/02*** | (2006.01) |
| ***B25J 18/02*** | (2006.01) |
| ***B25J 18/04*** | (2006.01) |

(52) U.S. Cl.

CPC ......... *B25J 17/0258* (2013.01); *B25J 18/025* (2013.01); *B25J 18/04* (2013.01); *B25J 9/104* (2013.01)

(56) References Cited

U.S. PATENT DOCUMENTS

| | | | | | |
|---|---|---|---|---|---|
| 4,407,625 | A * | 10/1983 | Shum | B25J 17/0266 | 901/14 |
| 4,435,116 | A * | 3/1984 | Van Deberg | B25J 9/10 | 414/718 |
| 4,569,627 | A * | 2/1986 | Simunovic | B25J 9/04 | 901/14 |
| 4,768,918 | A | 9/1988 | Gorman | | |
| 4,819,496 | A * | 4/1989 | Shelef | B25J 17/0216 | 901/29 |
| 5,056,278 | A * | 10/1991 | Atsukawa | E04H 12/185 | 248/161 |
| 5,582,617 | A | 12/1996 | Klieman | | |
| 5,740,699 | A * | 4/1998 | Ballantyne | B25J 9/0069 | 403/120 |
| 8,490,511 | B2 * | 7/2013 | Saito | B25J 9/104 | 74/490.04 |
| 2019/0314978 | A1 | 10/2019 | Hunt | | |
| 2020/0375678 | A1 | 12/2020 | Wallace | | |

OTHER PUBLICATIONS

International Preliminary Report on Patentability and Written Opinion mailed Nov. 27, 2025, for PCT Application No. PCT/US2024/028977 filed May 10, 2024, 9 pages.

* cited by examiner

EXTENSION AND RETRACTION ACTUATORS WITH PARALLEL ARRANGEMENT

REFERENCE TO RELATED APPLICATION

This application claims the benefit of U.S. Provisional Application No. 63/587,436, filed Oct. 2, 2023, and U.S. Provisional Application No. 63/466,091, filed May 12, 2023, the entire disclosures of which are incorporated herein by reference for all purposes.

FIELD

Examples of the disclosure relate generally to actuators, and more specifically, to extendable and retractable robotic actuator systems and methods of controlling the same.

BACKGROUND

Robotic systems see increasing application across fields as diverse as health care, agriculture, manufacturing, construction, warehousing, logistics, retail, transportation, entertainment, defense, and domestic use. Robotic systems can operate autonomously, such as via a programmable computer control system; at the direction of a human operator; or via a combination of human and computer control. In some cases, collaborative robots (or "cobots") can interact or work collaboratively with humans, whether directly or indirectly.

Some robotic systems include robotic arms for manipulating objects, or performing other tasks, via an end effector. For example, an end effector can include a gripper for picking up and moving objects, or a tool (such as a drill, laser, or welding torch) for performing a specific task. In some examples, an end effector can include a sensor, such as a camera or a microphone, and a robotic arm can manipulate the position and orientation of that sensor. It will be appreciated that various other end effectors or end effector components can be used.

Some robotic arms use a serial configuration of joints and linkages (e.g., linear actuators) to manipulate an end effector. For example, a robotic arm can include a base; a first linkage coupled to the base at a shoulder joint; a second linkage coupled to the first linkage at an elbow joint; and an end effector coupled to another end of the second linkage. However, arms with such serial configurations suffer from disadvantages, including joint error propagation (e.g., propagation of error from a shoulder joint to an elbow joint) and low torque production, both of which can limit the ability of the arm to effectively and repeatably manipulate an end effector, particularly for precision applications.

Disclosed herein are systems and methods relating to actuators, such as linear actuators that may be employed in robotic arms. Actuators such as described herein may be configured in a parallel configuration and used to manipulate an end effector. For example, two linear actuators may be coupled to a base at their first respective ends; and coupled to an end effector at their second respective ends. The actuators can be extended and retracted with respect to the base such that the end effector is manipulated in space while enjoying sufficient structural support by the actuators. Embodiments described herein can advantageously avoid the drawbacks associated with serial configurations, such as by reducing joint error propagation and improving torque production, while providing sufficient structural support and remaining suitable for large workspaces and scalable to various environments or workspaces (including workbench-scale or room-scale workspaces).

BRIEF SUMMARY

According to an embodiment of the disclosure, a system comprises an end effector, a base, a first actuator, a second actuator, and a control circuit. The first actuator comprises a proximal end coupled to the base at a first joint, a distal end coupled to the end effector, a rotatable member, and a coiling support member coupled to the distal end. The coiling support member has a first length. At least a portion of the first length is configured to coil around the rotatable member and further configured to uncoil from the rotatable member. The second actuator comprises a proximal end coupled to the base at a second joint, the second joint separated from the first joint by a distance, and a distal end coupled to the end effector. The control circuit is configured to extend and retract the first actuator along an axis of the first actuator and further configured to extend and retract the second actuator along an axis of the second actuator. Retracting the first actuator comprises coiling the first length around the rotatable member, and extending the first actuator comprises uncoiling the first length from the rotatable member.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1A:
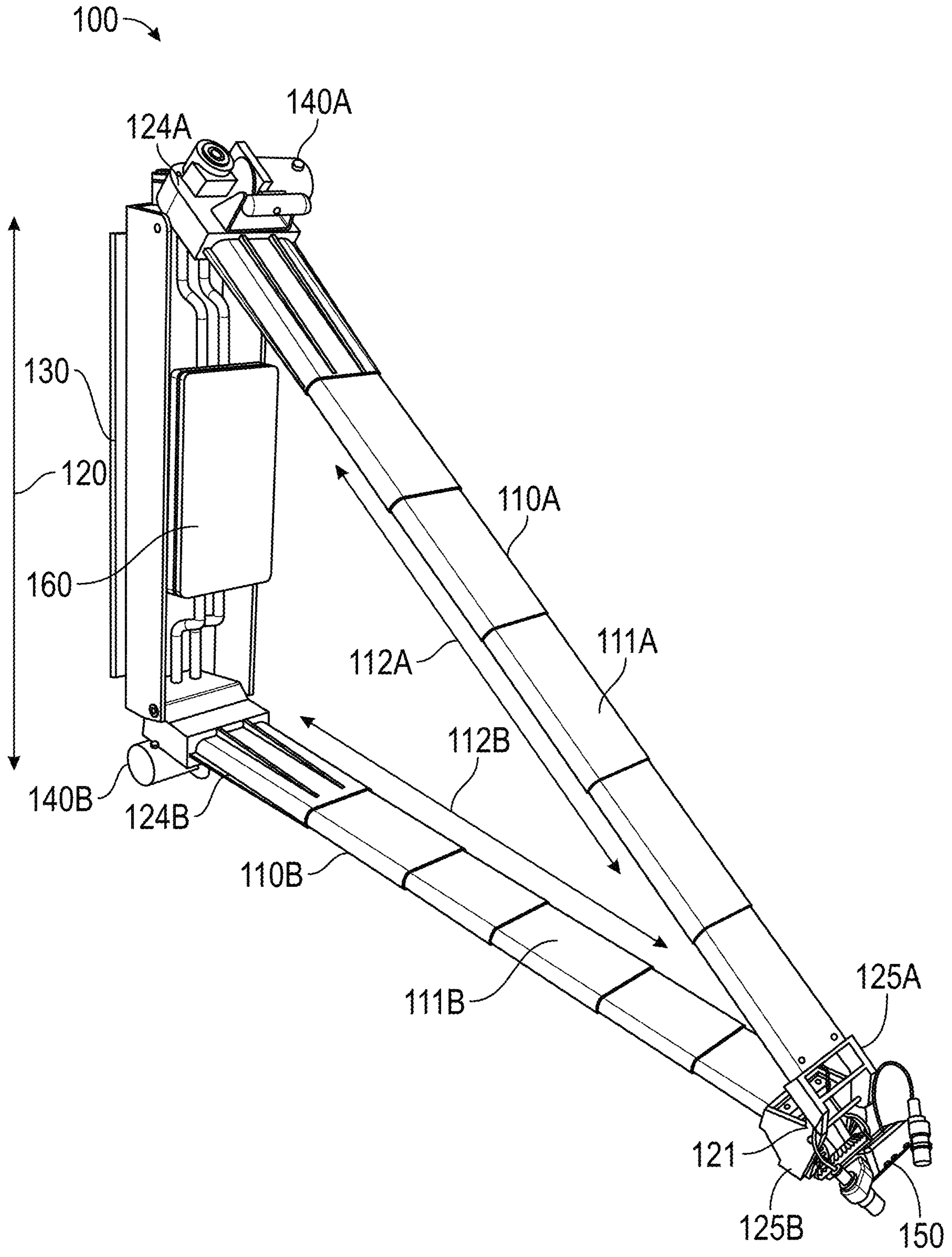
FIGS. 1A-1B illustrate example robotic systems according to embodiments of the disclosure.
Figure 1B:
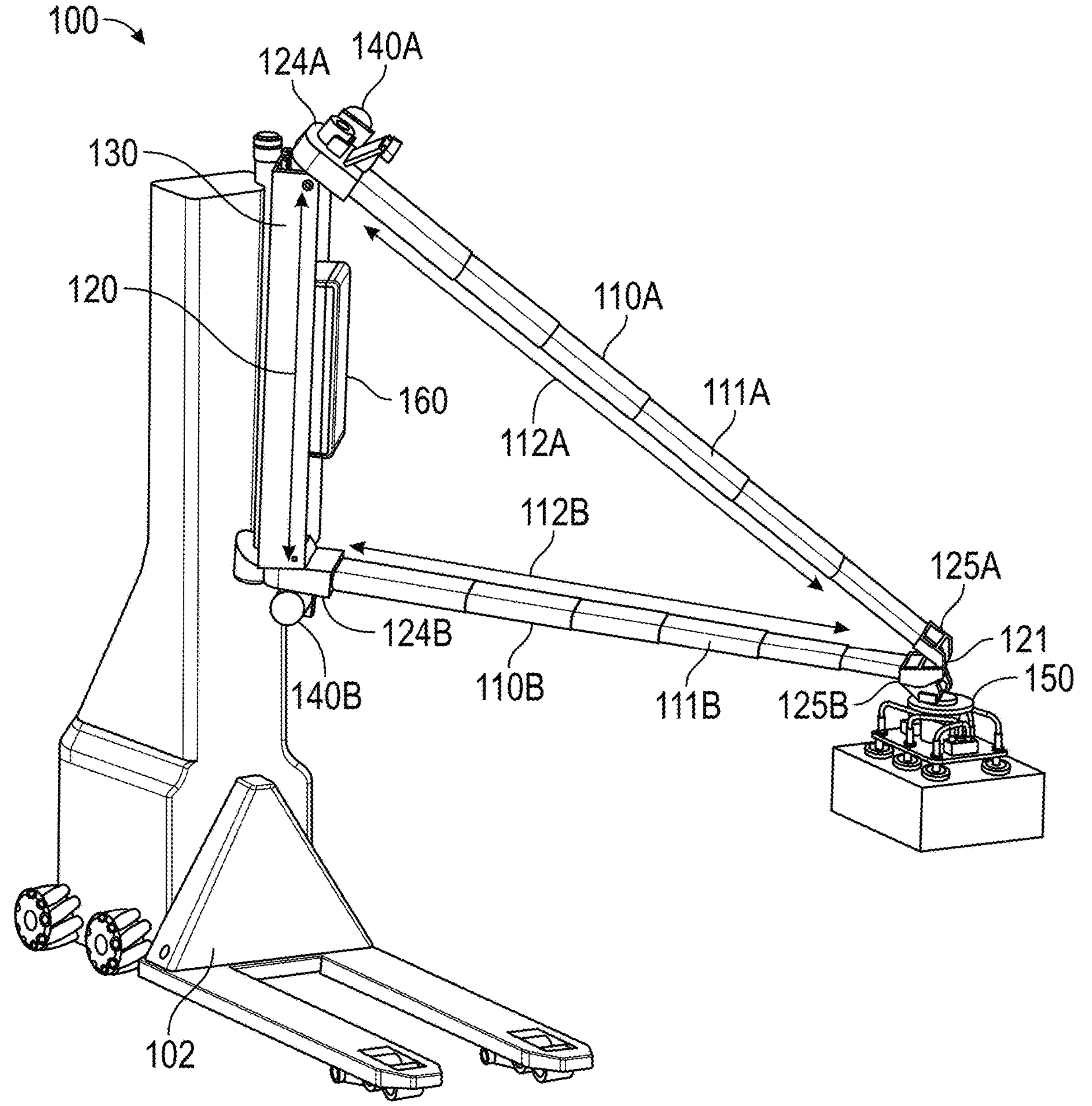

FIGS. 1A-1B show an example robotic system 100 according to some embodiments. In some embodiments, robotic system 100 includes actuators 110A and 110B, which may be described as linear actuators; a mounting structure 130 (which may be referred to as a base); and an end effector 150. Actuators 110A and 110B may be referred to as HERA (Hyper Extension and Retraction Actuator) actuators. In the example shown, as described further below, each of actuators 110A and 110B has a respective first end 124A/124B that is coupled to a location of the mounting structure 130; and a respective second end 125A/125B that is coupled (e.g., by a hinge 121) to the end effector 150. This configuration can be described as a parallel configuration of actuators 110A and 110B. That is, actuators 110A and 110B can operate in parallel, with respect to mounting structure 130 and end effector 150, to manipulate end effector 150. In comparison, a configuration in which the first end of actuator 110B is coupled to a second end of actuator 110A, rather than to the mounting structure 130, could be described as a serial configuration of actuators 110A and 110B, such that actuators 110A and 110B operate in series to manipulate end effector 150. Each respective first end of each actuator can be described as a proximal end of that actuator with respect to the mounting structure 130. Each respective second end of each actuator can be described as a distal end of that actuator with respect to mounting structure 130. In some embodiments, the second ends 125A/125B may be coupled to each other.

Actuators 110A and 110B may be coupled to the mounting structure 130 at locations on the mounting structure 130 that, in some embodiments, are separated by a distance 120. In the example of FIG. 1, mounting structure 130 is shown as a substantially linear member, but other suitable embodiments of mounting structure 130 are within the scope of the disclosure. For example, in some cases, mounting structure 130 can comprise two or more members in a suitable configuration. In some cases, mounting structure 130 can comprise a curved or otherwise non-linear member. In some cases, mounting structure 130 can comprise a wall, a vehicle, a workbench, or another suitable structural element. In some cases, mounting structure 130 can comprise a span, with actuators 110A and 110B coupled to a frame of the span and separated by the span. For example, mounting structure 130 can comprise a window such that actuators 110A and 110B are coupled to a frame of the window.

In FIGS. 1A and 1B, actuators 110A and 110B are shown with a telescoping cover (111A and 111B respectively). Telescoping cover 111A/111B can comprise one or more telescoping members configured to expand and retract in accordance with the expansion or retraction of the actuator 110A/110B. Telescoping cover 111A/111B can protect internal components of actuator 110A/110B from the elements (e.g., foreign objects, dust or other contaminants); obscure the internal components from view; promote user safety; and/or enhance the cosmetic appearance of actuator 110A/110B, for example by allowing the actuator to blend in with mounting structure 130 or with an environment.

Each of actuator 110A and 110B can be coupled to mounting structure 130 at its respective proximal end 124A/124B via a respective joint 140A/140B. Joint 140A/140B can be an active or passive 1-DoF (degree of freedom) joint that rotates about a single axis. In some examples, joint 140A/140B can be an active or passive 2-DoF joint that rotates around two axes. In some embodiments, mounting structure 130 can rotate around one or more axes (e.g., a vertical axis) and can further move and/or rotate, such as via a wheeled platform, such as platform 102 shown in FIG. 1B. In this way, robotic system 100 and actuators 110A and 110B can be made to move and rotate with respect to an environment of robotic system 100.

In the example shown, each of actuators 110A and 110B has a respective distal end 125A/125B that is coupled to the end effector 150. End effector 150 can comprise any of a gripper mechanism, a sensor (e.g., a camera, a microphone, a scanning or ranging sensor such as LIDAR, infrared, sonar, or any other suitable sensor or combination of sensors), a tool for performing a task (e.g., a drill, a laser, a scalpel, a measuring device, or any other suitable tool or combination of tools), or any other suitable effector. In some examples, end effector 150 can comprise one or more changeable components, such as changeable end effector heads, that can be changed in the field. Actuator 110A/110B can extend and retract linearly along a longitudinal actuator axis 112A/112B, so as to bring the distal end 125A/125B (and the end effector 150 coupled to the distal end) closer to the proximal end 124A/124B (and thus the robotic base 130) as described further below.

In some embodiments, control circuitry 160 can be mounted to the mounting structure 130, such as via a cavity of mounting structure 130 or a housing coupled to mounting structure 130, and used to control one or more aspects of robotic system 100, including actuators 110A/110B, such as described below. Control circuitry 160 can include one or more components of control system 600, described below with respect to FIG. 6.

Figure 2A:
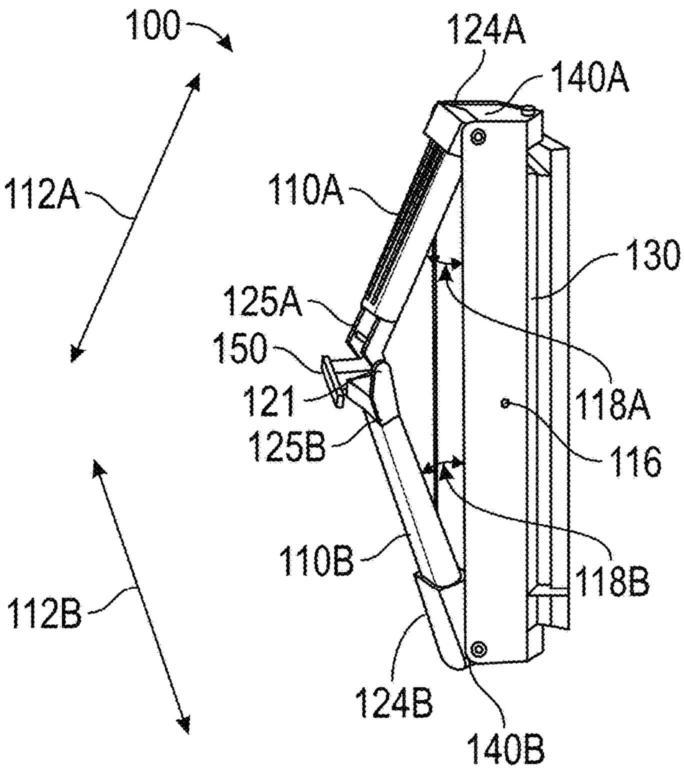
FIGS. 2A-2C illustrate views of an example robotic system according to embodiments of the disclosure.
Figure 2B:
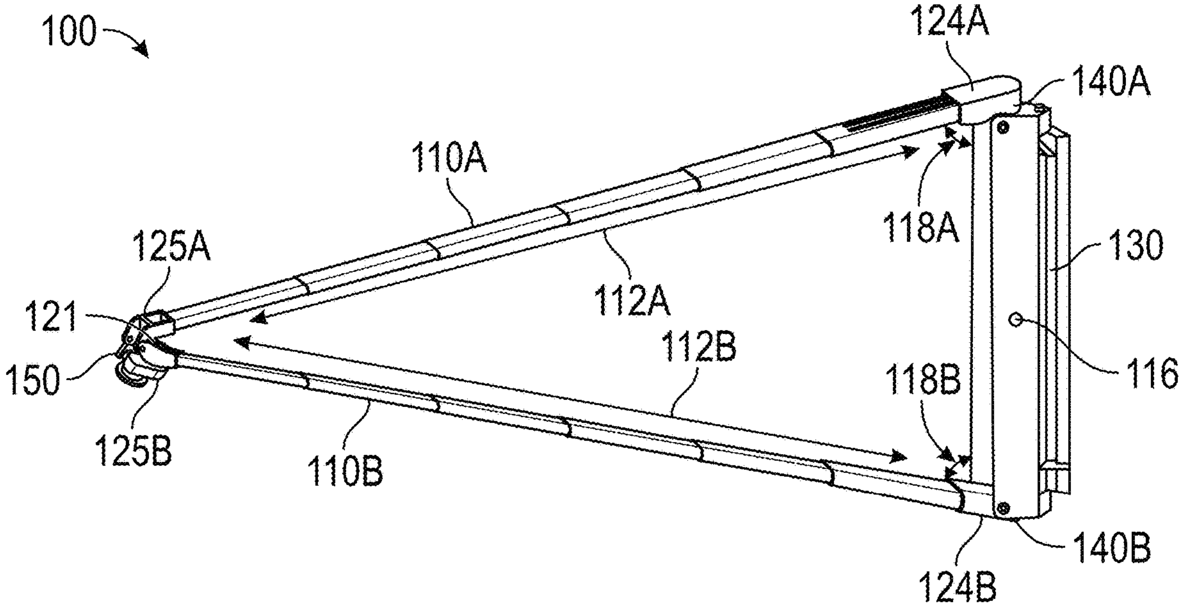
Figure 2C:
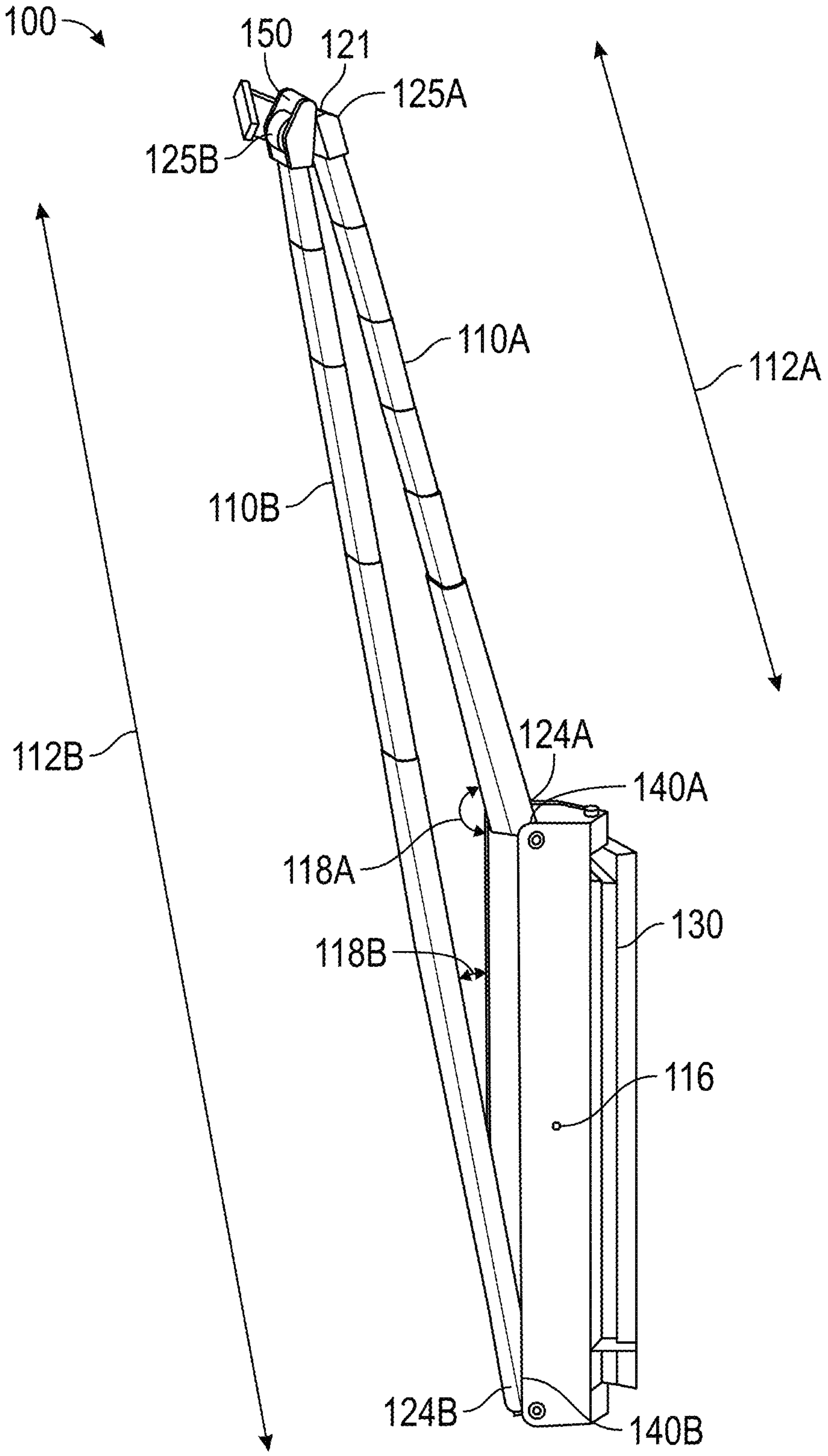

FIGS. 2A-2C show views of example robotic system 100, according to some embodiments, and illustrate examples of how actuators 110A and 110B can be extended and retracted (such as by control circuitry 160 as described below) to manipulate end effector 150 with respect to mounting structure 130. In each of FIGS. 2A through 2C, actuators 110A and 110B each include a respective proximal end that is coupled to mounting structure 130 via a respective 1-DoF joint, forming a respective joint angle 118A/118B with respect to the mounting structure 130; and a respective distal end that is coupled to end effector 150. Because the end effector 150 is coupled to the distal end 125A of actuator 110A and further coupled to the distal end 125B of actuator 110B, the location of end effector 150 with respect to a reference point 116 (which may be fixed relative to the mounting structure 130) is determined by the respective lengths of the actuators 110A and 110B.

For example, in FIG. 2A, actuators 110A and 110B are extended to substantially equal lengths along actuator axis 112A/112B, such that end effector 150 is positioned at a vector with respect to a reference point 116 (i.e., at a length from reference point 116 and at an angle with respect to an axis containing reference point 116). In FIG. 2B, actuators 110A and 110B are extended to longer, but still substantially equal, lengths, such that end effector 150 is positioned at a vector with respect to reference point 116. In FIG. 2C, actuator 110A is retracted to a shorter length compared to FIG. 2B, said length shorter than the length of actuator 110B in FIG. 2C, such that end effector 150 is positioned at a vector with respect to reference point 116. It will be appreciated that by extending and retracting actuators 110A and 110B, such as illustrated in FIGS. 2A-2C, end effector 150 can be manipulated to be positioned at a desired vector (e.g., displacement and/or orientation) with respect to reference point 116 or mounting structure 130. It will be further appreciated that the position and orientation of end effector 150 with respect to the environment of robotic system 100 can be further manipulated by manipulating mounting structure 130 and/or joints 140A/140B. For example, mounting structure 130 can be rotated (e.g., with respect to a vertical axis) or translated (e.g., by movement of platform 102), thereby manipulating end effector 150 via actuators 110A and 110B that are coupled to mounting structure 130.

Figure 3A:
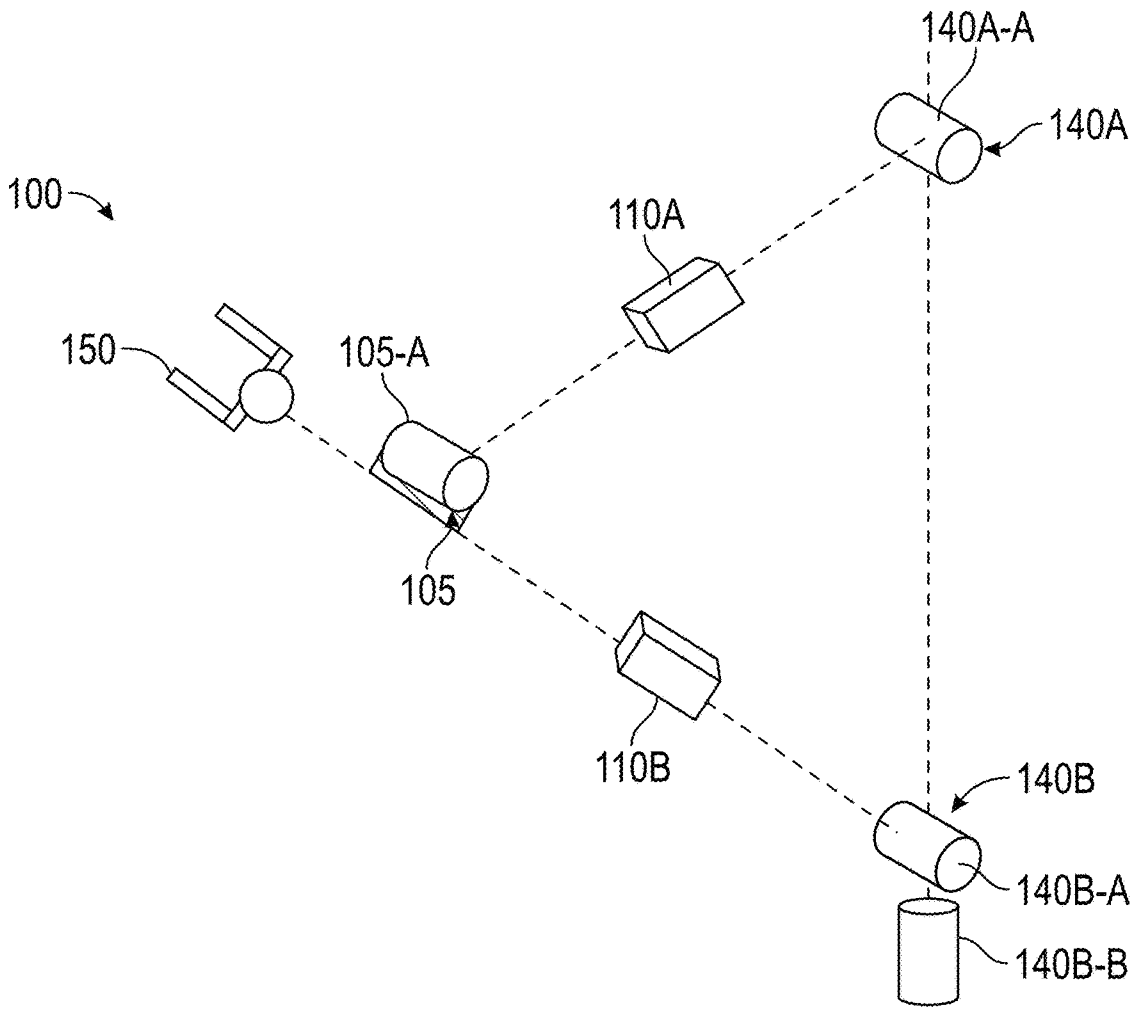
FIGS. 3A-3C illustrate example configurations of a robotic system according to embodiments of the disclosure.
Figure 3B:
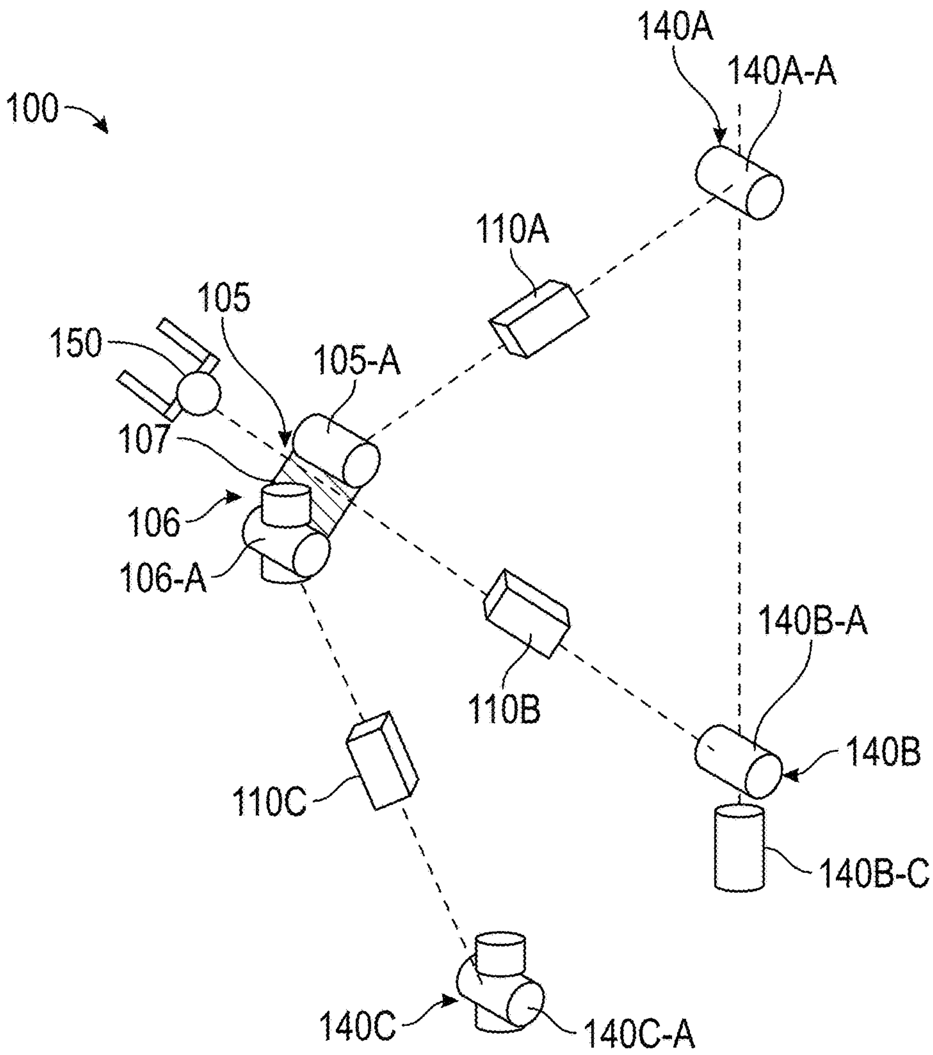
Figure 3C:
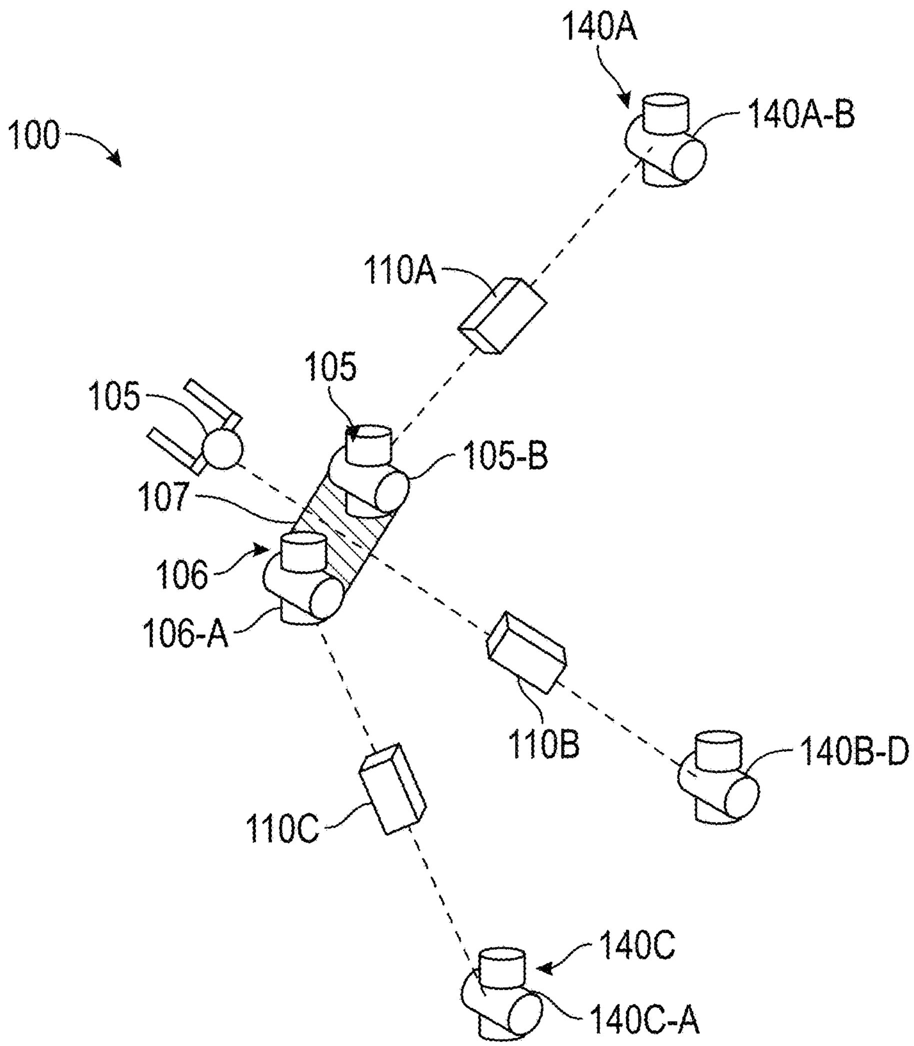

FIGS. 3A-3C show example configurations of a robotic system 100 including two or more actuators. In each of FIGS. 3A and 3B, example robotic system 100 comprises actuators 110A and 110B arranged in a parallel configuration with respect to a mounting structure 130 (not shown), such as described above. Actuators 110A and 110B are coupled at their respective proximal ends 124A and 124B to mounting structure 130 via joints 140A and 140B, respectively, such as described above. Actuators 110A and 110B are further coupled at their respective distal ends 125A and 125B to end effector 150, such as described above.

In FIG. 3A, joint 140A can comprise a passive rotational joint 140A-A; and joint 140B can comprise one or more of a passive rotational joint 140B-A and an active rotational joint 140B-B. Further, in the example in FIG. 3A, distal ends 125A and 125B are coupled to end effector 150 via joint 105. Joint 105 can comprise a passive rotational joint 105-A via which end effector 150 can rotate with respect to actuators 110A and 110B.

In FIG. 3B, example robotic system 100 comprises a third actuator 110C. Actuator 110C can be in a parallel configuration with actuators 110A and 110B. Actuator 110C can be coupled to mounting structure 130 at its proximal end 124C via joint 140C, which can comprise a passive 2-DoF joint 140C-A; and can be further coupled to end effector 150 at its distal end 125C, such as via joint 106. Joint 106 can be coupled to joint 105 and end effector 150 via a rigid linkage 107. Joint 105 can comprise a passive 2-DoF joint 105-A that is configured to rotate with respect to two axes. Joint 106 can comprise a passive 2-DoF joint 106-A that is configured to rotate with respect to two axes. In FIG. 3B, joint 140B can comprise passive rotational joint 140B-A and a passive rotational joint 140B-C. Compared to the example in FIG. 3A, in which joint B comprises active rotational joint 140B-B, passive rotational joint 140B-C permits actuators 110A and 110B to be rotated around an axis by the extension and retraction of actuator 110C, which can apply a torque to actuators 110A and 110B by the rigid linkage 107. This can be advantageous in that it permits end effort 150 to be manipulated in three dimensions by the operation (extension and retraction) of actuators 110A, 110B, and 110C, without necessarily involving or requiring an actively driven rotation of joint 140B or mounting structure 130. As shown in the example, joint 140B can be a passive joint.

In FIG. 3C, example robotic system 100 comprises a third actuator 110C, which can be arranged in a parallel configuration with actuators 110A and 110B such as described above for FIG. 3B. In FIG. 3C, joint 140A can comprise a passive 2-DoF joint 140A-B; and joint 140B can comprise a passive 2-DoF joint 140B-D. Joint 140C can comprise a passive 2-DoF joint 140C-A as described above for FIG. 3B. As described above for FIG. 3B, joint 106 can be coupled to joint 105 and end effector 150 via a rigid linkage 107. As described above for FIG. 3B, joint 106 can comprise a passive 2-DoF joint 106-A that is configured to rotate with respect to two axes. In the example shown for FIG. 3C, joint 105 can comprise a passive rotational joint 105-B, permitting rotation of rigid linkage 107 and end effector 150 in two dimensions with respect to actuator 110A. As with the example shown in FIG. 3B, this example configuration permits end effector 105 to be manipulated in three dimensions, with respect to an environment, by the operation (extension and retraction) of actuators 110A, 110B, and 110C.

Figure 4A:
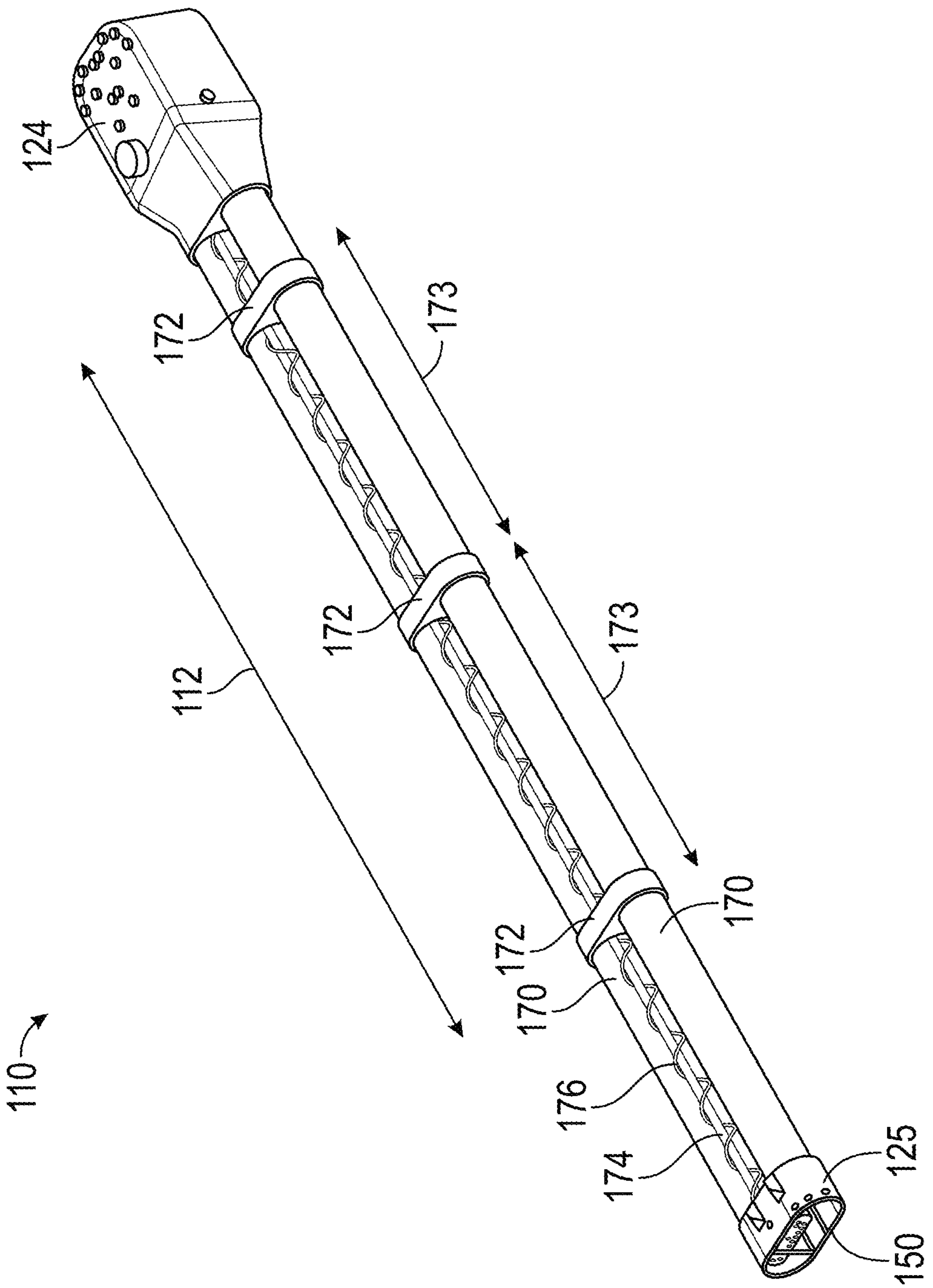
FIGS. 4A and 4B illustrate an example actuator according to embodiments of the disclosure.
Figure 4B:
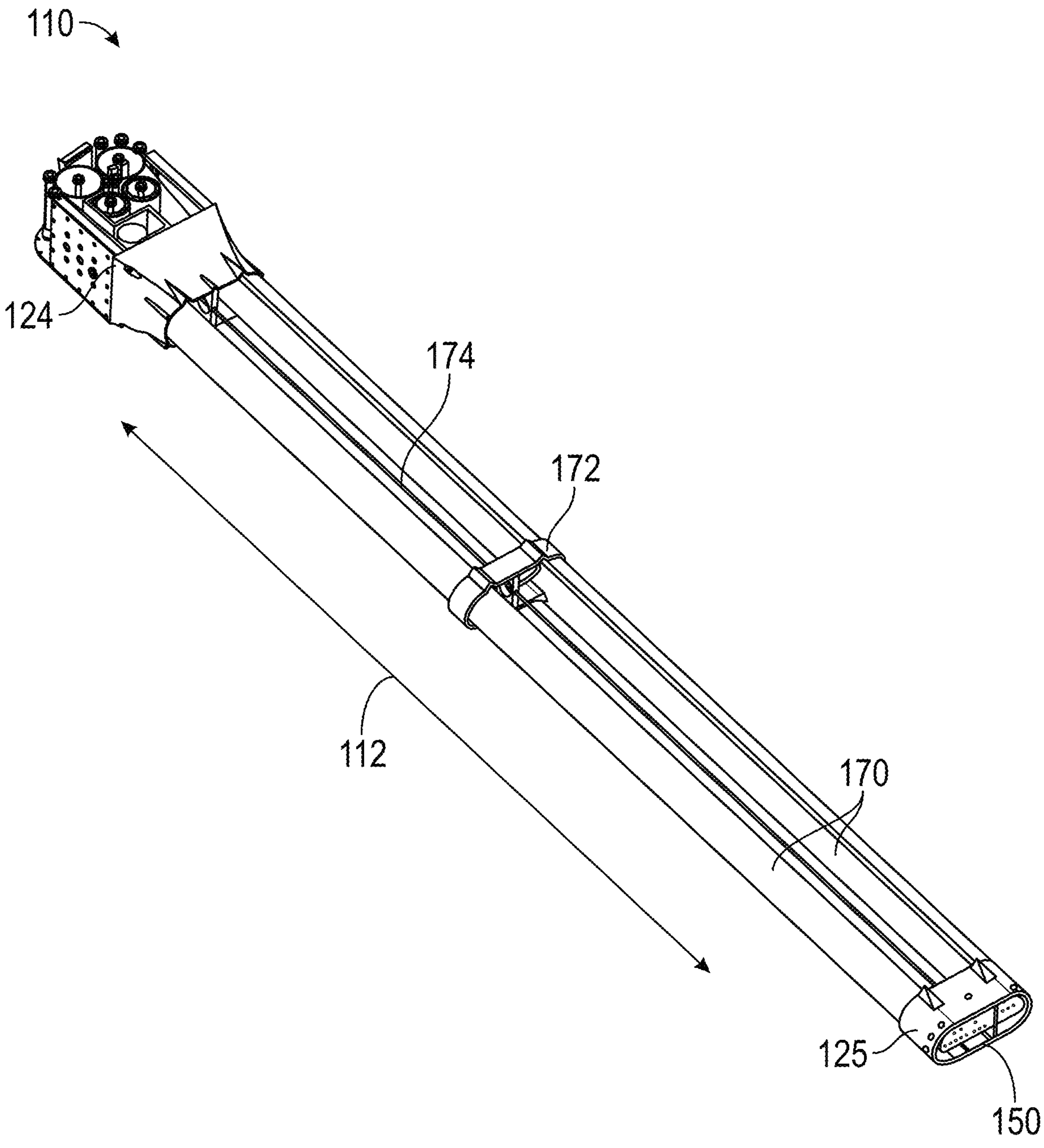

FIGS. 4A and 4B show views of an example actuator 110, which may correspond to any or all of actuators 110A, 110B, or 110C described above with respect to example robotic system 100. An axis 112 (which may correspond to 112A/112B described above) of actuator 110 extends longitudinally along actuator 110. A proximal end 124 (which may correspond to 124A/124B described above) of actuator 110 is configured to couple to mounting structure 130 as described above, and a distal end 125 (which may correspond to 125A/125B described above) of actuator 110 is configured to couple to end effector 150, such as via a hinge 121, as described above. In embodiments, one or more components of actuator 110 may be covered by a telescoping cover, such as telescoping cover 111A/111B described above with respect to FIGS. 1A and 1B.

In embodiments, actuator 110 includes one or more coiling support members 170. Coiling support members 170 are configured to provide rigidity and structural support for actuator 110. In embodiments, coiling support members 170 provide sufficient structural support to prevent structural failure when a torque is applied to actuator 110 via end effector 150 (e.g., when an object is lifted via a gripper of end effector 150). A portion of, or the entirety of, a coiling support member 170 is configured to flexibly coil around one or more rotatable members 182, such as a spindle of proximal end 124 as described below, to permit extension and retraction of actuator 110 such as described above. Coiling support members 170 may be substantially thin to permit coiling around rotatable member 182, as described below.

In some embodiments, coiling support members 170 may comprise a spring steel material, such as 1075 spring steel. However, it will be appreciated that, in embodiments, coiling support members 170 can comprise any of various materials that provide both suitable structural support for actuator 110 and suitable flexibility to permit extension and retraction of actuator 110.

In the example shown in FIGS. 4A and 4B, actuator 110 includes two coiling support members 170, each such member extending longitudinally along a side of actuator 110 via axis 112. It will be appreciated that, in embodiments, actuator 110 may include only a single coiling support member 170; or may include three or more coiling support members 170. One or more coiling support members 170 may be coupled to proximal end 124 as described further below. The coiling support member 170 may additionally be coupled to the distal end 125 of actuator 110, for example by being fixed to an anchor point of the distal end 125, such that a force may be applied to the distal end 125 (and thus to end effector 150) via the extension and retraction of coiling support member 170. In embodiments, a rigid cap or end plate of distal end 125 can connect two or more coiling support members 170.

Example actuator 110 can include one or more cross-sectional braces 172, which may be disposed in a series longitudinally along actuator 110 via axis 112, each brace in the series separated by a spacing 173, which may be adjustable as described below. Each of the cross-sectional braces 172 may extend laterally across actuator 110 and provide structural bracing for coiling support members 170. In some embodiments, the cross-sectional braces 172 may be permitted to displace (e.g., slide) along actuator 110, in accordance with the extension and retraction of the actuator 110, such that the spacing 173 between the cross-sectional braces may increase or decrease accordingly. In embodiments, this may be achieved via one or more extendable and retractable cables 174, which may be coupled to proximal end 124 and/or distal end 125 and may be configured to extend and retract in accordance with the extension and retraction of the actuator 110. In some embodiments, cables 174 may be comprised of spring steel, such as 1075 spring steel, or another suitable material. The cables 174 may be coupled to one or more of cross-sectional braces 172, such that the cross-sectional braces 172 are pulled closer together by the cables 174 as the actuator 110 retracts, and pushed farther apart by the cables 174 as the actuator 110 extends. In some embodiments, cables 174 may be disposed within actuator 110, and/or within a negative space defined in whole or part by coiling support members 170. In some embodiments, cross-sectional braces 172 can be wholly or partially stored within proximal end 124 as the cross-sectional braces 172 are pulled closer and as actuator 110 retracts to a retracted position.

In some embodiments, a first cable (e.g., cable 174) is coupled to a first cross-sectional brace of cross-sectional braces 172, and further coupled to mounting structure 130, proximal end 124, or joint 140. As actuator 110 extends, the first cross-sectional brace can be displaced in the extending direction by a first length with respect to mounting structure 130, proximal end 124, or joint 140, in accordance with actuator 110 extending by a second length. In some embodiments, this displacement of the first cross-sectional brace can be performed via friction between the first cross-sectional brace and coiling support member 170. In embodiments, once actuator 110 has been extended beyond the second length, the first cable can secure, via tension in the first cable, the first cross-sectional brace in a fixed position with respect to mounting structure 130, proximal end 124, or joint 140. Conversely, once actuator 110 is retracted to less than the second length, the first cross-sectional brace can be displaced in the retracting direction by the friction between the first cross-sectional brace and coiling support member 170.

In some embodiments, a second cable (e.g., cable 174), which may be coextensive with the first cable, is coupled to a second cross-sectional brace of cross-sectional braces 172, and further coupled to the first cross-sectional brace of cross-sectional braces 172. As actuator 110 extends, the second cross-sectional brace can be displaced in the extending direction by a third length with respect to mounting structure 130, proximal end 124, or joint 140, in accordance with actuator 110 extending by a fourth length. In some embodiments, this displacement of the second cross-sectional brace can be performed via friction between the second cross-sectional brace and coiling support member 170. In embodiments, once actuator 110 has been extended beyond the fourth length, the second cable can secure, via tension in the second cable, the second cross-sectional brace in a fixed position (which may correspond to or be based on distance 173 in FIG. 4A) with respect to mounting structure 130, proximal end 124, joint 140, or the first cross-sectional brace. Conversely, once actuator 110 is retracted to less than the fourth length, the second cross-sectional brace can be displaced in the retracting direction by the friction between the second cross-sectional brace and coiling support member 170. In some embodiments, as described above, cross-sectional braces 172 can be wholly or partially stored within proximal end 124 as the cross-sectional braces 172 are pulled closer and as actuator 110 retracts to a retracted position.

Example actuator 110 can include electrical conduit 176, which may be configured to electrically couple end effector 150 with control circuitry 160. For example, conduit 176 can provide power and transmit electrical signals (e.g., control and/or data signals) to and from end effector 150 (e.g., a sensor of end effector 150) and control circuitry 160. In some embodiments, conduit 176 may comprise electrical wire or cabling arranged in a helix. A first end of the helix may be coupled to proximal end 124 of actuator 110, and a second end of the helix may be coupled to distal end 125 of actuator 110, such that the helix expands and compresses along axis 112 as actuator 110 extends and retracts. This can advantageously allow conduit 176 to maintain a manageable shape as actuator 110 extends and retracts, for example to avoid pinching or structural damage to conduit 176.

Figure 5A:
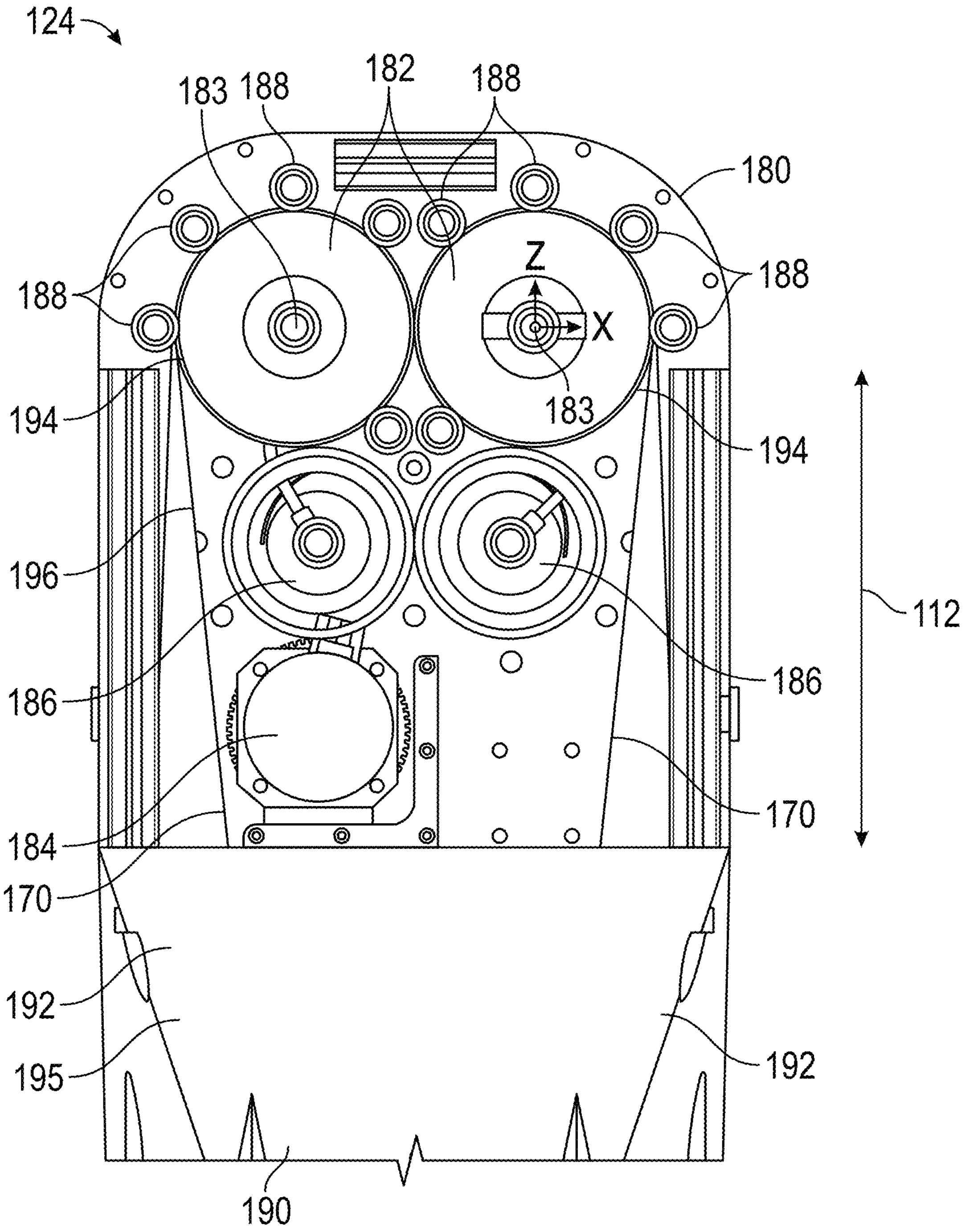
FIGS. 5A-5C illustrate views of an example actuator according to embodiments of the disclosure.
Figure 5B:
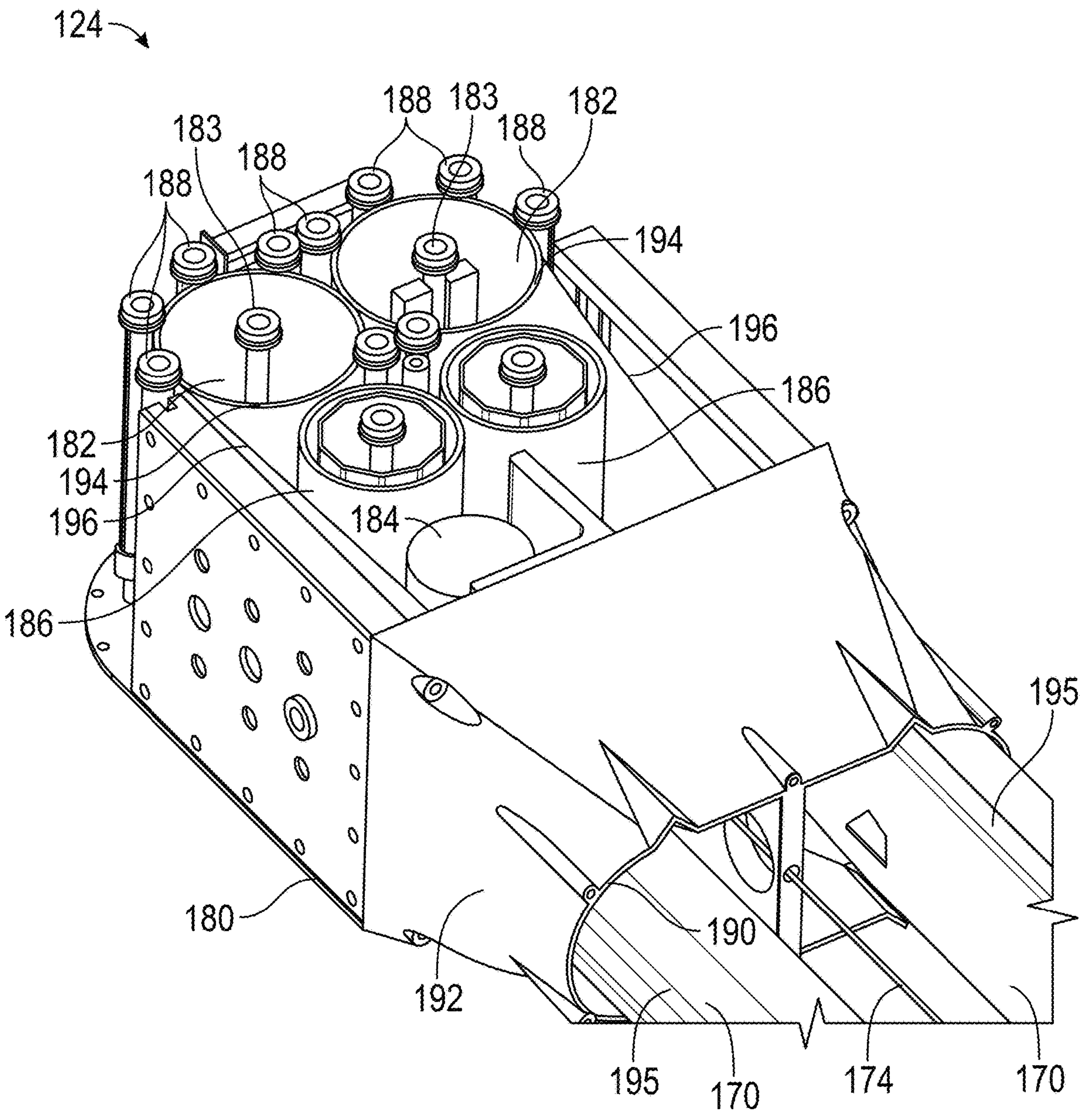
Figure 5C:
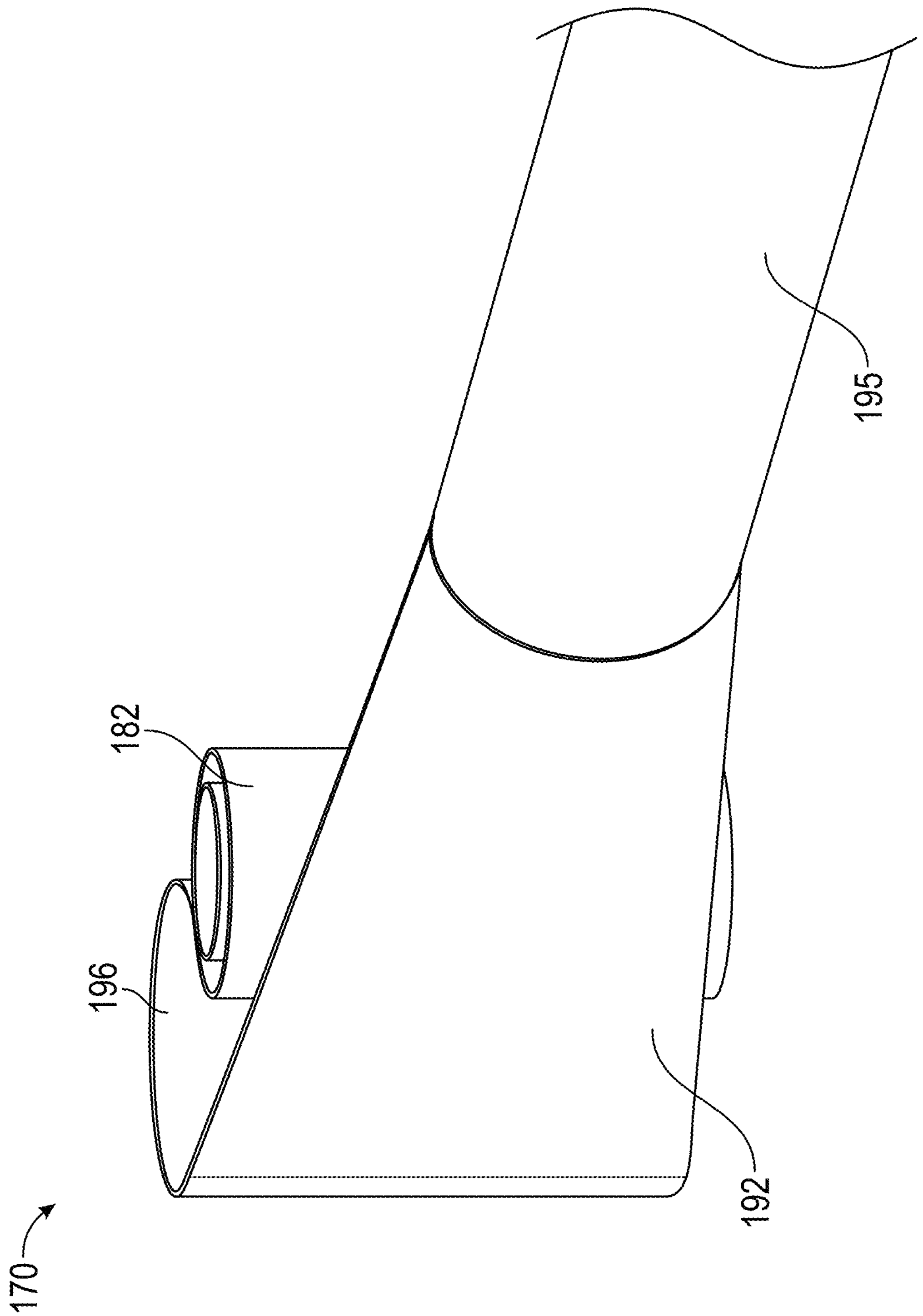

FIGS. 5A-5C show views of an example actuator 110, which may correspond to any or all of actuators 110A, 110B, or 110C described above with respect to example robotic system 100. FIGS. 5A and 5B show example proximal ends 124 of actuator 110. FIG. 5C shows an example coiling support member 170, having cross-sectional profiles 195 and 196 as described further below, that may be disposed within proximal end 124 of actuator 110. In some embodiments, such as shown in FIGS. 5A and 5B, proximal end 124 can include a frame 180 that encloses one or more components as described below. In some embodiments, proximal end 124 includes one or more rotatable members 182. A rotatable member 182 can include a spindle, a drum, a disc, a gear, a sprocket, a post, a spool, or another suitable member configured to rotate about a respective axis 183. In some embodiments, rotatable member 182 is substantially cylindrical.

In some embodiments, rotatable member 182 can include a spring-loaded member, such as a spring-loaded spindle. In such embodiments, a restoring force of the spring-loaded member can apply a torque to the rotatable member 182, causing the member to rotate.

In some embodiments, rotatable member 182 can include an actuated member, such as an actuated spindle. The actuated member can be driven by a motor, such as motor 184, which can apply a torque to the rotatable member 182, thus causing the rotatable member 182 to rotate. In some embodiments, the rotatable member 182 may be driven directly by motor 184. In some embodiments, the rotatable member 182 may be driven by motor 184 via a one or more gearboxes or transmissions 186, such as shown in the figures. In embodiments, one or more rotatable members 182 can be caused to rotate by the application of control signals by control circuitry 160. For example, as described further below, control circuitry 160 can apply a control signal to motor 184, activating motor 184 and causing rotatable member 182 to rotate accordingly. In some cases, a single motor 184 can be used to drive multiple rotatable members 182, which may in turn coil or uncoil multiple coiling support members 170. Various driving configurations of motors 184, transmissions 186, rotatable members 182 will be apparent to those of skill in the art and are within the scope of the disclosure.

Coiling support members 170, such as shown for example in FIGS. 5A-5C, can be configured to coil and uncoil around the rotatable member 182. For example, an end of coiling support member 170 can be anchored to rotatable member 182, or to another component or anchor point of proximal end 124. As shown for example in FIGS. 5A-5C, actuator 110 can include two coiling support members 170, which may be connected (e.g. via an end plate) or separate from each other. A coiling support member 170 can include a first length (which may be the entire length of coiling support member 170, or a portion of that entire length), which may include or be adjacent to the anchored end of coiling support member 170, that extends along actuator 110 to proximal end 124. The first length can be configured to coil and uncoil around the rotatable member 182. For example, the first length can pass from actuator 110 through an opening 190 (e.g., a slot) of the proximal end 124, from which it may be fed (e.g., via an S-shaped spooling) to a surface 194 of rotatable member 182. In some embodiments, one or more rollers 188 can be configured to apply power transmission between motor 184 and the coiling support member 170, permitting or assisting the coiling support member 170 in coiling and uncoiling around the rotatable member 182. Rollers 188 can be configured to maintain contact pressure between the rotatable member 182 and the coiling support member 170.

In embodiments, as rotatable member 182 is rotated in a first direction (e.g., clockwise) by applying a first torque to the rotatable member, the first length of coiling support member 170 coils around rotatable member 182, thereby applying a pulling force, via coiling support member 170, to the end effector 150 coupled to the distal end 125 of the actuator 110. The actuator 110 is thus retracted by the pulling force as the first length of coiling support member 170 coils around rotatable member 182. Conversely, as rotatable member 182 is rotated in a second direction (e.g., counter-clockwise) by applying a second torque to the rotatable member, the first length of coiling support member 170 uncoils from rotatable member 182, thereby applying a pushing force, via coiling support member 170, to the end effector 150. The actuator 110 is thus extended by the pushing force as the first length of coiling support member 170 uncoils from rotatable member 182.

In some embodiments, a surface 194 of rotatable member 182 has a coefficient of friction such that rotating the rotatable member 182 coils the coiling support member 170 around the surface 194 by applying a frictional force to the first length of the coiling support member 170. Friction between the surface 194 of rotatable member 182 and the coiling support member 170, and/or friction between the coiling support member 170 and itself, can secure the first length in a coiled position, providing structural support. In some embodiments, rotatable member 182 may include knobs, bumps, teeth, or other protrusions; and coiling support member 170 can include holes, divots, or other elements configured to receive the protrusions, thereby permitting or assisting the coiling support member 170 to coil around rotatable member 182 and to remain coiled. Other mechanisms for coupling coiling support member 170 to rotatable member 182 will be apparent to those skilled in the art and are within the scope of the disclosure.

In embodiments, it may be advantageous for the coiling support member 170 to be elastically deformable into two or more cross-sectional profiles. As used herein, a cross-sectional profile of coiling support member 170 can refer to a two-dimensional cross-sectional shape of a portion of coiling support member 170, such as when viewed along the axis 112 of the actuator 110.

For example, in FIGS. 5A-5C, portion 195 of coiling support member 170 corresponds to a first cross-sectional profile in which the profile is curved (e.g., at least partially C-shaped). In the example, portion 195 includes a portion of coiling support member 170 that runs longitudinally along axis 112 of actuator 110. Deforming portion 195 into a curved cross-sectional profile can be advantageous, because a curved profile can lend additional structural strength to coiling support structure 170 as it supports actuator 110 and end effector 150. It will be appreciated that various cross-sectional profiles of portion 195, including tubular and elliptical (including circular) profiles, may be advantageously used to improve the structural strength of coiling support member 170 and thus actuator 110.

As shown in FIGS. 5A-5C, portion 196 of coiling support member 170 corresponds to a second cross-sectional profile in which the profile is substantially flat. In the example, portion 196 includes a portion of coiling support member 170 that is coiled around rotatable member 182. Deforming portion 196 into a flat cross-sectional profile can be advantageous because a flat profile can facilitate the coiling of coiling support member 170 around rotatable member 182, for example compared to a curved profile as described for portion 195, and can improve the stability of the coil.

In embodiments, such as shown in FIGS. 5A and 5B, coiling support member 170 can include both a first (e.g., curved) profile portion 195 and a second (e.g., flat) profile portion 196. In some embodiments, actuator 110 and/or proximal end 124 can include a rigid shaping member 192 that is configured to deform portions of coiling support member 170 as it extends and retracts. For example, as coiling support member 170 retracts, coiling a first length of coiling support member 170 around rotatable member 182, coiling support member 170 may pass over shaping member 192 in a first direction, such that a portion of coiling support member 170 contacts shaping member 192 and is deformed from a first (e.g., curved) profile to a second (e.g., flat) profile by the contact. Conversely, as coiling support member 170 extends, uncoiling a first length of coiling support member 170 from rotatable member 182, coiling support member 170 may pass over shaping member 192 in a second direction, such that a portion of coiling support member 170 contacts shaping member 192 and is deformed from the second profile to the first profile by the contact. In this manner, actuator 110 can benefit from coiling support member 170 having the first profile in a region along actuator 110, thereby improving structural strength; and having the second profile in a region in proximal end 124, thereby improving the ability of actuator 110 to retract and extend (via coiling and uncoiling of coiling support member 170 around rotatable member 182). In embodiments, rigid member may be disposed within enclosure 180.

For clarity, while the embodiments shown in FIGS. 5A-5C include two rotatable members 182 and two gearboxes 186, embodiments in which a proximal end 124 includes more or fewer rotatable members 182 (and respective axes 183), or more or fewer gearboxes 186, than depicted in FIGS. 5A-5C are contemplated and are within the scope of the disclosure. For example, in some embodiments, a proximal end 124 includes three or more rotatable members 182; in some embodiments, a proximal end 124 includes one rotatable member 182; in some embodiments, a proximal end 124 includes three or more gearboxes 186; and in some embodiments, a proximal end 124 includes one gearbox 186. In some embodiments, a proximal end 124 includes one rotatable member 182 and one gearbox 186.

Figure 6:
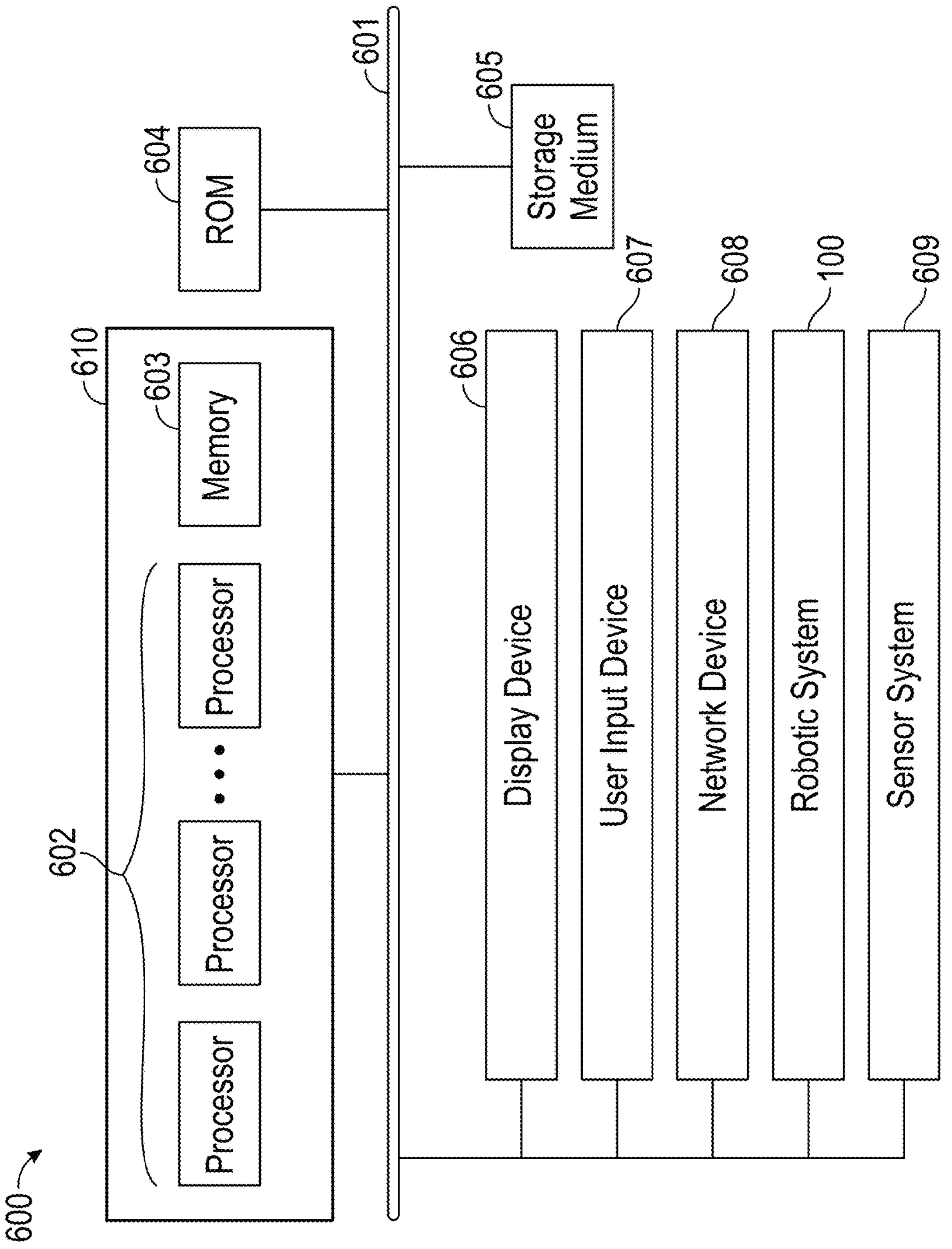
FIG. 6 illustrates an example control system diagram for a robotic system according to embodiments of the disclosure.

FIG. 6 shows an example control system 600 that can be used to control aspects of robotic system 100. In some embodiments, some or all components of control system 600 can be implemented via a single computing device, or via two or more devices in communication such as via a communication network. In some embodiments, one or more components of control system 600 may be implemented as modules of a system on a chip (SoC). In some embodiments, components of control system 600 may be implemented in any suitable combination of electronic hardware and software. Further, one or more components of control system 600 may be implemented via common hardware or software, such that the components of control system 600 described below do not necessarily correspond to discrete hardware or software units. In some embodiments, some or all components of control system 600 can be implemented via control circuitry 160, described above with respect to example robotic system 100. In some embodiments, some components of control system 600 can be implemented via control circuitry 160, which may be configured to communicate with a remote computer device implementing components of control system 600.

Control system 600 can include one or more processors 602, which may be in communication with a memory 603, which may comprise random access memory (RAM). Processors 602 can include one or more central processing units (CPUs), graphical processing units (GPUs), field programmable gate arrays (FPGAs), microprocessors, dedicated artificial intelligence or machine learning processors such as tensor processing units (TPUs), or other suitable processors.

In some embodiments, processors 602 and/or memory 603 may belong to a processing unit 610. Processing unit 610 can communicate (e.g., via a communications channel 601, which may comprise a wired or wireless connection) with a read-only memory (ROM) 604, or another suitable computer-readable storage medium (e.g., storage medium 605), which can be a non-transitory computer-readable storage medium storing computer-readable instructions for execution by one or more processors 602. ROM 604 and/or storage medium 605 can include one or more of a hard drive, a flash drive, an optical disc (such as a CD, DVD, or Blu-Ray), an electrically erasable programmable read-only memory (EEPROM), or any other suitable medium.

When executed by the one or more processors, the machine-readable instructions can cause the one or more processors to perform a computer-implemented method such as any of the methods described herein. Any or all of processor(s) 602, memory 603, ROM 604, and storage medium 605 can communicate (e.g., via communication channel 601) with one or more of: one or more robotic systems 100, such as described herein; a display device 606, such as a monitor, touch screen, or any device suitable for displaying an output relating to a robotic system 100; a user input device 607, such as a keyboard, mouse, joystick, touch panel, touch screen, or any device suitable for controlling or providing input to a robotic system 100; a network device 608, which may include an ethernet or Wi-Fi network interface, which may be used to communicate with robotic system 100; and one or more sensors 609, which may include a sensor of end effector 150 (e.g., a camera, microphone, or scanning device) as described above.

In some embodiments, communications channel 601 can comprise conduit 176 described above. In some embodiments, communication channel 601 can send and receive control and/or data signals to and from one or more components of robotic system 100 described above. Control and/or data signals can include signals for controlling one or more of rotatable member 182 (e.g., via motor 184); mounting structure 130 (e.g., via a motor configured to cause mounting structure 130 to rotate about an axis); platform 102; joints 140A/140B; cable 174; end effector 150, or any other suitable component or combination of components of robotic system 100.

In some embodiments, the control circuit may be configured to receive a desired position and/or orientation of end effector 150, and to apply control signals determined based on that desired position and/or orientation. That is, the control circuit may be configured to apply (e.g., to rotatable member 182) control signals that will result in the end effector 150 being moved to the desired position and/or orientation. In some embodiments, a suitable machine learning algorithm may be used to determine the desired position/and or orientation, or the control signals. For example, the algorithm may provide, as output, one or more desired positions or orientations, or control signals, that correspond to a desired action or path of end effector 150. In some embodiments, a desired position and/or orientation of end effector 150, or one or more control signals as described above, can be received from a human operator, such as via user input device 607, or via network device 608. Moreover, in some embodiments, a desired position and/or orientation of end effector 150, or one or more control signals as described above, can be determined based on an output of sensors 609.

According to one or more embodiments of the disclosure, a system comprises an end effector, a base, a first actuator, a second actuator, and a control circuit. The first actuator comprises a proximal end coupled to the base at a first joint, a distal end coupled to the end effector, a rotatable member, and a coiling support member coupled to the distal end. The coiling support member has a first length. At least a portion of the first length is configured to coil around the rotatable member and further configured to uncoil from the rotatable member. The second actuator comprises a proximal end coupled to the base at a second joint, the second joint separated from the first joint by a distance, and a distal end coupled to the end effector. The control circuit is configured to extend and retract the first actuator along an axis of the first actuator and further configured to extend and retract the second actuator along an axis of the second actuator. Retracting the first actuator comprises coiling the first length around the rotatable member, and extending the first actuator comprises uncoiling the first length from the rotatable member.

According to some embodiments, the coiling support member comprises spring steel. According to some embodiments, the base further comprises a third joint; the apparatus further comprises a third actuator comprising a proximal end coupled to the base at the third joint and a distal end coupled to the end effector; and the control circuit is further configured to extend and retract the third actuator along an axis of the third actuator. According to some embodiments, coiling the first length around the rotatable member comprises applying, by the control circuit, a first torque to the rotatable member, and uncoiling the first length from the rotatable member comprises applying, by the control circuit, a second torque to the rotatable member. According to some embodiments, the first actuator further comprises: one or more cross-sectional braces; and a cable coupled to the one or more cross-sectional braces, wherein the cable is configured to displace the one or more cross-sectional braces with respect to the base in accordance with extending the first actuator and further in accordance with retracting the first actuator. According to some embodiments, the first actuator is configured to store the one or more cross-sectional braces at the proximal end of the first actuator in accordance with retracting the first actuator to a retracted position. According to some embodiments, the first actuator further comprises: a first cross-sectional brace; and a first cable coupled to the first cross-sectional brace and further coupled to the base, wherein: the system is configured to displace, via friction with the coiling support member, the first cross-sectional brace by a first length with respect to the base in accordance with extending the first actuator by a corresponding second length; the first cable is configured to secure, via tension of the first cable, the first cross-sectional brace at a first distance with respect to the base in accordance with extending the first actuator by a length greater than the second length. According to some embodiments, the first actuator further comprises: a second cross-sectional brace; and a second cable coupled to the first cross-sectional brace and further coupled to the second cross-sectional brace, wherein: the system is configured to displace, via friction with the coiling support member, the second cross-sectional brace by a third length with respect to the base in accordance with extending the first actuator by a corresponding fourth length; the second cable is configured to secure, via tension of the second cable, the second cross-sectional brace at a second distance with respect to the base in accordance with extending the first actuator by a length greater than the fourth length. According to some embodiments, the coiling support member is deformable into a first cross-sectional profile and further deformable into a second cross-sectional profile. According to some embodiments, the first cross-sectional profile comprises a curved profile, and the second cross-sectional profile comprises a substantially flat profile. According to some embodiments, the first cross-sectional profile comprises a substantially elliptical profile. According to some embodiments, the first cross-sectional profile corresponds to a first portion of the coiling support member, the first portion not coiled around the rotatable member, and the second cross-sectional profile corresponds to a second portion of the coiling support member, the second portion configured to coil around the rotatable member. According to some embodiments, the proximal end comprises a shaping member configured to: deform a portion of the coiling support member into the first cross-sectional profile in accordance with extending the coiling support member, and deform the portion of the coiling support member into the second cross-sectional profile in accordance with retracting the coiling support member. According to some embodiments, the rotatable member comprises a spindle. According to some embodiments, the spindle comprises a spring-loaded spindle. According to some embodiments, the spindle comprises an actuated spindle. According to some embodiments, the rotatable member comprises a surface configured to apply a frictional force to the first length of the coiling support member. According to some embodiments, the rotatable member comprises one or more protrusions and the first length of the coiling support member is configured to receive the one or more protrusions. According to some embodiments, the system further comprises: a motor; and one or more rollers configured to provide power transmission between the motor and the coiling support member. According to some embodiments, the first joint comprises an active joint. According to some embodiments, the first joint comprises a passive joint. According to some embodiments, the first joint comprises a 1 degree-of-freedom joint. According to some embodiments, the first joint comprises a 2 degree-of-freedom joint. According to some embodiments, the base is rotatable around an axis and the control circuit is further configured to rotate the base around the axis. According to some embodiments, the base is coupled to a movable platform and the control circuit is further configured to move the movable platform. According to some embodiments, the end effector comprises a sensor. According to some embodiments, the end effector comprises a gripper. According to some embodiments, the end effector comprises a tool. According to some embodiments, the first actuator further comprises a telescoping cover configured to extend in accordance with extending the first actuator and further configured to retract in accordance with retracting the first actuator. According to some embodiments, the system further comprises an electrical conduit configured to communicate electrical signals between the control circuit and the end effector. According to some embodiments, the electrical conduit comprises a helix configured to expand along the axis of the first actuator in accordance with extending the first actuator and further configured to compress along the axis of the first actuator in accordance with retracting the first actuator. According to some embodiments, the control circuit is further configured to receive a target position of the end effector, and extending and retracting the first actuator comprises applying one or more control signals to the rotatable member based on the target position. According to some embodiments, the target position is received via an output of a machine learning algorithm.

According to one or more embodiments of the disclosure, a method comprises extending a first actuator of a robotic system, wherein the first actuator comprises: a proximal end coupled to a base at a first joint, a distal end coupled to an end effector, a rotatable member, and a coiling support member coupled to the distal end, the coiling support member having a first length, wherein at least a portion of the first length is configured to coil around the rotatable member and further configured to uncoil from the rotatable member; retracting the first actuator; extending a second actuator of the robotic system, wherein the second actuator comprises: a proximal end coupled to the base at a second joint, the second joint separated from the first joint by a distance, and a distal end coupled to the end effector; and retracting the second actuator, wherein: said retracting the first actuator comprises coiling the first length around the rotatable member, and said extending the first actuator comprises uncoiling the first length from the rotatable member.

According to some embodiments, the coiling support member comprises spring steel. According to some embodiments, the base further comprises a third joint; and the method further comprises extending a third actuator along an axis of the third actuator and retracting the third actuator along the axis of the third actuator, wherein the third actuator comprises a proximal end coupled to the base at the third joint and a distal end coupled to the end effector. According to some embodiments, coiling the first length around the rotatable member comprises applying a first torque to the rotatable member, and uncoiling the first length from the rotatable member comprises applying a second torque to the rotatable member. According to some embodiments, the first actuator further comprises: one or more cross-sectional braces; and a cable coupled to the one or more cross-sectional braces, wherein the method further comprises displacing, via the cable, the one or more cross-sectional braces with respect to the base in accordance with extending the first actuator and further in accordance with retracting the first actuator. According to some embodiments, the method further comprises storing the one or more cross-sectional braces at the proximal end of the first actuator in accordance with retracting the first actuator to a retracted position. According to some embodiments, the first actuator further comprises: a first cross-sectional brace; and a first cable coupled to the first cross-sectional brace and further coupled to the base, wherein the method further comprises displacing, via friction with the coiling support member, the first cross-sectional brace by a first length with respect to the base in accordance with extending the first actuator by a corresponding second length; and securing, via tension of the first cable, the first cross-sectional brace at a first distance with respect to the base in accordance with extending the first actuator by a length greater than the second length. According to some embodiments, the first actuator further comprises: a second cross-sectional brace; and a second cable coupled to the first cross-sectional brace and further coupled to the second cross-sectional brace, and the method further comprises: displacing, via friction with the coiling support member, the second cross-sectional brace by a third length with respect to the base in accordance with extending the first actuator by a corresponding fourth length; and securing, via tension of the second cable, the second cross-sectional brace at a second distance with respect to the base in accordance with extending the first actuator by a length greater than the fourth length. According to some embodiments, the coiling support member is deformable into a first cross-sectional profile and further deformable into a second cross-sectional profile. According to some embodiments, the first cross-sectional profile comprises a curved profile, and the second cross-sectional profile comprises a substantially flat profile. According to some embodiments, the first cross-sectional profile comprises a substantially elliptical profile. according to some embodiments, the first cross-sectional profile corresponds to a first portion of the coiling support member, the first portion not coiled around the rotatable member, and the second cross-sectional profile corresponds to a second portion of the coiling support member, the second portion configured to coil around the rotatable member. According to some embodiments, the proximal end comprises a shaping member; and the method further comprises: deforming, via the shaping member, a portion of the coiling support member into the first cross-sectional profile in accordance with extending the coiling support member, and deforming, via the shaping member, the portion of the coiling support member into the second cross-sectional profile in accordance with retracting the coiling support member. According to some embodiments, the rotatable member comprises a spindle. According to some embodiments, the spindle comprises a spring-loaded spindle. According to some embodiments, the spindle comprises an actuated spindle. According to some embodiments, the rotatable member comprises a surface and the method further comprises applying, by the surface, a frictional force to the first length of the coiling support member. According to some embodiments, the rotatable member comprises one or more protrusions and the first length of the coiling support member is configured to receive the one or more protrusions. According to some embodiments, the method further comprises providing, via one or more rollers, power transmission between a motor and the coiling support member. According to some embodiments, the first joint comprises an active joint. According to some embodiments, the first joint comprises a passive joint. According to some embodiments, the first joint comprises a 1 degree-of-freedom joint. According to some embodiments, the first joint comprises a 2 degree-of-freedom joint. According to some embodiments, the method further comprises rotating the base around an axis. According to some embodiments, the base is coupled to a movable platform and the method further comprises moving the movable platform. According to some embodiments, the end effector comprises a sensor. According to some embodiments, the end effector comprises a gripper. According to some embodiments, the end effector comprises a tool. According to some embodiments, the first actuator further comprises a telescoping cover configured to extend in accordance with extending the first actuator and further configured to retract in accordance with retracting the first actuator. According to some embodiments, the method further comprises communicating, via an electrical conduit, electrical signals between the control circuit and the end effector. According to some embodiments, the electrical conduit comprises a helix configured to expand along the axis of the first actuator in accordance with extending the first actuator and further configured to compress along the axis of the first actuator in accordance with retracting the first actuator. According to some embodiments, the method further comprises receiving a target position of the end effector, wherein said extending the first actuator comprises applying one or more control signals to the rotatable member based on the target position. According to some embodiments, the target position is received via an output of a machine learning algorithm.

According to one or more embodiments of the disclosure, a non-transitory computer-readable storage medium stores instructions which, when executed by one or more processors, cause the one or more processors to perform a method according to any of the methods described above.

Although the present invention has been fully described in connection with examples thereof with reference to the accompanying drawings, it is to be noted that various changes and modifications will become apparent to those skilled in the art. Such changes and modifications are to be understood as being included within the scope of the claimed subject matter. The various examples of the invention should be understood as presented by way of example only, and not by way of limitation. Although the invention is described above in terms of various examples and implementations, it should be understood that the various features and functionality described in one or more of the individual examples are not limited in their applicability to the particular example with which they are described. They instead can, be applied, alone or in some combination, to one or more of the other examples of the invention, whether or not such examples are described, and whether or not such features are presented as being a part of a described example. Thus the breadth and scope of the claimed subject matter should not be limited by any of the above-described examples.

Terms and phrases used in this document, and variations thereof, unless otherwise expressly stated, should be construed as open ended as opposed to limiting. As examples of the foregoing, the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known," and terms of similar meaning, should not be construed as limiting the item described to a given time period, or to an item available as of a given time. These terms should instead be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/of" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to," or other like phrases in some instances shall not be read to mean that the narrower case is intended or required in instances where such broadening phrases may be absent. The word "exemplary" is used herein to mean "serving as an example or illustration." Any aspect or design described herein as "exemplary" is not necessarily to be construed as preferred or advantageous over other aspects or designs.

It will be appreciated that, for clarity purposes, the above description has described examples of the invention with reference to different functional units and modules. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization. It should be understood that the specific order or hierarchy of steps in the processes disclosed herein is an example of exemplary approaches. Based upon design preferences, it is understood that the specific order or hierarchy of steps in the processes may be rearranged while remaining within the scope of the claimed subject matter. Further, in some examples, some steps in the processes disclosed herein may be forgone altogether while remaining within the scope of the claimed subject matter.

What is claimed is:

1. A system comprising:
- an end effector;
- a base;
- a first actuator comprising:
  - a proximal end coupled to the base at a first joint,
  - a distal end coupled to the end effector,
  - a rotatable member, and
  - a coiling support member coupled to the distal end, the coiling support member having a first length, wherein at least a portion of the first length is configured to coil around the rotatable member and further configured to uncoil from the rotatable member;
- a second actuator comprising a proximal end coupled to the base at a second joint, the second joint separated from the first joint by a distance, and a distal end coupled to the end effector;
- a control circuit configured to extend and retract the first actuator along an axis of the first actuator and further configured to extend and retract the second actuator along an axis of the second actuator; and
- an electrical conduit configured to communicate electrical signals between the control circuit and the end effector, wherein:
- retracting the first actuator comprises coiling the first length around the rotatable member,
- extending the first actuator comprises uncoiling the first length from the rotatable member, and
- the electrical conduit comprises a helix configured to expand along the axis of the first actuator in accordance with extending the first actuator and further configured to compress along the axis of the first actuator in accordance with retracting the first actuator.

2. The system of claim 1, wherein the coiling support member comprises spring steel.

3. The system of claim 1, wherein:
- the base further comprises a third joint;
- the apparatus further comprises a third actuator comprising a proximal end coupled to the base at the third joint and a distal end coupled to the end effector; and
- the control circuit is further configured to extend and retract the third actuator along an axis of the third actuator.

4. The system of claim 1, wherein:
- coiling the first length around the rotatable member comprises applying, by the control circuit, a first torque to the rotatable member, and
- uncoiling the first length from the rotatable member comprises applying, by the control circuit, a second torque to the rotatable member.

5. The system of claim 1, wherein the first actuator further comprises:
- one or more cross-sectional braces; and
- a cable coupled to the one or more cross-sectional braces, wherein the cable is configured to displace the one or more cross-sectional braces with respect to the base in accordance with extending the first actuator and further in accordance with retracting the first actuator.

6. The system of claim 5, wherein the first actuator is configured to store the one or more cross-sectional braces at the proximal end of the first actuator in accordance with retracting the first actuator to a retracted position.

7. The system of claim 1, wherein the first actuator further comprises:
- a first cross-sectional brace; and
- a first cable coupled to the first cross-sectional brace and further coupled to the base, wherein:
- the system is configured to displace, via friction with the coiling support member, the first cross-sectional brace by a first length with respect to the base in accordance with extending the first actuator by a corresponding second length;
- the first cable is configured to secure, via tension of the first cable, the first cross-sectional brace at a first distance with respect to the base in accordance with extending the first actuator by a length greater than the second length.

8. The system of claim 7, wherein the first actuator further comprises:
- a second cross-sectional brace; and
- a second cable coupled to the first cross-sectional brace and further coupled to the second cross-sectional brace, wherein:
- the system is configured to displace, via friction with the coiling support member, the second cross-sectional brace by a third length with respect to the base in accordance with extending the first actuator by a corresponding fourth length;
- the second cable is configured to secure, via tension of the second cable, the second cross-sectional brace at a second distance with respect to the base in accordance with extending the first actuator by a length greater than the fourth length.

9. The system of claim 1, wherein the coiling support member is deformable into a first cross-sectional profile and further deformable into a second cross-sectional profile.

10. The system of claim 9, wherein:
- the first cross-sectional profile comprises a curved profile, and
- the second cross-sectional profile comprises a substantially flat profile.

11. The system of claim 10, wherein:
- the first cross-sectional profile corresponds to a first portion of the coiling support member, the first portion not coiled around the rotatable member, and
- the second cross-sectional profile corresponds to a second portion of the coiling support member, the second portion configured to coil around the rotatable member.

12. The system of claim 10, wherein the proximal end of the first actuator comprises a shaping member configured to:
- deform a portion of the coiling support member into the first cross-sectional profile in accordance with extending the coiling support member, and deform the portion of the coiling support member into the second cross-sectional profile in accordance with retracting the coiling support member.

13. The system of claim 9, wherein the first cross-sectional profile comprises a substantially elliptical profile.

14. The system of claim 1, wherein the rotatable member comprises a spindle.

15. The system of claim 14, wherein the spindle comprises a spring-loaded spindle.

16. The system of claim 14, wherein the spindle comprises an actuated spindle.

17. The system of claim 1, wherein the rotatable member comprises a surface configured to apply a frictional force to the first length of the coiling support member.

18. The system of claim 1, wherein the system further comprises:

a motor; and one or more rollers configured to provide power transmission between the motor and the coiling support member.

19. The system of claim 1, wherein the first joint comprises an active joint.

20. The system of claim 1, wherein the first joint comprises a passive joint.

21. The system of claim 1, wherein the first joint comprises a 1 degree-of-freedom joint.

22. The system of claim 1, wherein the first joint comprises a 2 degree-of-freedom joint.

23. The system of claim 1, wherein the base is rotatable around an axis and the control circuit is further configured to rotate the base around the axis.

24. The system of claim 1, wherein the base is coupled to a movable platform and the control circuit is further configured to move the movable platform.

25. The system of claim 1, wherein the end effector comprises a sensor.

26. The system of claim 1, wherein the end effector comprises a gripper.

27. The system of claim 1, wherein the end effector comprises a tool.

28. The system of claim 1, wherein the first actuator further comprises a telescoping cover configured to extend in accordance with extending the first actuator and further configured to retract in accordance with retracting the first actuator.

29. The system of claim 1, wherein:

the control circuit is further configured to receive a target position of the end effector, and extending and retracting the first actuator comprises applying one or more control signals to the rotatable member based on the target position.

30. The system of claim 29, wherein the target position is received via an output of a machine learning algorithm.

31. A method comprising:

extending a first actuator of a robotic system, wherein the first actuator comprises:

a proximal end coupled to a base at a first joint, a distal end coupled to an end effector, a rotatable member, and a coiling support member coupled to the distal end, the coiling support member having a first length, wherein at least a portion of the first length is configured to coil around the rotatable member and further configured to uncoil from the rotatable member;

retracting the first actuator;

extending a second actuator of the robotic system, wherein the second actuator comprises:

a proximal end coupled to the base at a second joint, the second joint separated from the first joint by a distance, and a distal end coupled to the end effector;

retracting the second actuator; and communicating, via an electrical conduit, electrical signals between a control circuit and the end effector, wherein:

said retracting the first actuator comprises coiling the first length around the rotatable member, said extending the first actuator comprises uncoiling the first length from the rotatable member, and the electrical conduit comprises a helix configured to expand along an axis of the first actuator in accordance with extending the first actuator and further configured to compress along the axis of the first actuator in accordance with retracting the first actuator.

32. The method of claim 31, wherein the coiling support member comprises spring steel.

33. The method of claim 31, wherein:

the base further comprises a third joint; and the method further comprises extending a third actuator along an axis of the third actuator and retracting the third actuator along the axis of the third actuator, wherein the third actuator comprises a proximal end coupled to the base at the third joint and a distal end coupled to the end effector.

34. The method of claim 31, wherein:

coiling the first length around the rotatable member comprises applying a first torque to the rotatable member, and uncoiling the first length from the rotatable member comprises applying a second torque to the rotatable member.

35. The method of claim 31, wherein the first actuator further comprises:

one or more cross-sectional braces; and a cable coupled to the one or more cross-sectional braces, and wherein the method further comprises displacing, via the cable, the one or more cross-sectional braces with respect to the base in accordance with extending the first actuator and further in accordance with retracting the first actuator.

36. The method of claim 35, further comprising storing the one or more cross-sectional braces at the proximal end of the first actuator in accordance with retracting the first actuator to a retracted position.

37. The method of claim 31, wherein the first actuator further comprises:

a first cross-sectional brace; and a first cable coupled to the first cross-sectional brace and further coupled to the base, and wherein the method further comprises:

displacing, via friction with the coiling support member, the first cross-sectional brace by a first length with respect to the base in accordance with extending the first actuator by a corresponding second length; and securing, via tension of the first cable, the first cross-sectional brace at a first distance with respect to the base in accordance with extending the first actuator by a length greater than the second length.

38. The method of claim 37, wherein the first actuator further comprises:

a second cross-sectional brace; and a second cable coupled to the first cross-sectional brace and further coupled to the second cross-sectional brace, and wherein the method further comprises:

displacing, via friction with the coiling support member, the second cross-sectional brace by a third length with respect to the base in accordance with extending the first actuator by a corresponding fourth length; and securing, via tension of the second cable, the second cross-sectional brace at a second distance with respect to the base in accordance with extending the first actuator by a length greater than the fourth length.

39. The method of claim 31, wherein the coiling support member is deformable into a first cross-sectional profile and further deformable into a second cross-sectional profile.

40. The method of claim 39, wherein:

the first cross-sectional profile comprises a curved profile, and the second cross-sectional profile comprises a substantially flat profile.

41. The method of claim 40, wherein:

the first cross-sectional profile corresponds to a first portion of the coiling support member, the first portion not coiled around the rotatable member, and the second cross-sectional profile corresponds to a second portion of the coiling support member, the second portion configured to coil around the rotatable member.

42. The method of claim 40, wherein:

the proximal end of the first actuator comprises a shaping member; and the method further comprises:

deforming, via the shaping member, a portion of the coiling support member into the first cross-sectional profile in accordance with extending the coiling support member, and deforming, via the shaping member, the portion of the coiling support member into the second cross-sectional profile in accordance with retracting the coiling support member.

43. The method of claim 39, wherein the first cross-sectional profile comprises a substantially elliptical profile.

44. The method of claim 31, wherein the rotatable member comprises a spindle.

45. The method of claim 44, wherein the spindle comprises a spring-loaded spindle.

46. The method of claim 44, wherein the spindle comprises an actuated spindle.

47. The method of claim 31, wherein the rotatable member comprises a surface and the method further comprises applying, by the surface, a frictional force to the first length of the coiling support member.

48. The method of claim 31, wherein the rotatable member comprises one or more protrusions and the first length of the coiling support member is configured to receive the one or more protrusions.

49. The method of claim 31, further comprising providing, via one or more rollers, power transmission between a motor and the coiling support member.

50. The method of claim 31, wherein the first joint comprises an active joint.

51. The method of claim 31, wherein the first joint comprises a passive joint.

52. The method of claim 31, wherein the first joint comprises a 1 degree-of-freedom joint.

53. The method of claim 31, wherein the first joint comprises a 2 degree-of-freedom joint.

54. The method of claim 31, further comprising rotating the base around an axis.

55. The method of claim 31, wherein the base is coupled to a movable platform and the method further comprises moving the movable platform.

56. The method of claim 31, wherein the end effector comprises a sensor.

57. The method of claim 31, wherein the end effector comprises a gripper.

58. The method of claim 31, wherein the end effector comprises a tool.

59. The method of claim 31, wherein the first actuator further comprises a telescoping cover configured to extend in accordance with extending the first actuator and further configured to retract in accordance with retracting the first actuator.

60. The method of claim 31, further comprising receiving a target position of the end effector, wherein said extending the first actuator comprises applying one or more control signals to the rotatable member based on the target position.

61. The method of claim 60, wherein the target position is received via an output of a machine learning algorithm.

62. A non-transitory computer-readable storage medium storing instructions which, when executed by one or more processors, cause the one or more processors to perform a method comprising:

extending a first actuator of a robotic system, wherein the first actuator comprises:

a proximal end coupled to a base at a first joint, a distal end coupled to an end effector, a rotatable member, and a coiling support member coupled to the distal end, the coiling support member having a first length, wherein at least a portion of the first length is configured to coil around the rotatable member and further configured to uncoil from the rotatable member;

retracting the first actuator;

extending a second actuator of the robotic system, wherein the second actuator comprises:

a proximal end coupled to the base at a second joint, the second joint separated from the first joint by a distance, and a distal end coupled to the end effector;

retracting the second actuator; and communicating, via an electrical conduit, electrical signals between a control circuit and the end effector, wherein:

said retracting the first actuator comprises coiling the first length around the rotatable member, said extending the first actuator comprises uncoiling the first length from the rotatable member, and the electrical conduit comprises a helix configured to expand along an axis of the first actuator in accordance with extending the first actuator and further configured to compress along the axis of the first actuator in accordance with retracting the first actuator.

* * * * *